US012554259B2

(12) United States Patent
Bradley et al.

(10) Patent No.: US 12,554,259 B2
(45) Date of Patent: Feb. 17, 2026

(54) SYSTEMS AND METHODS FOR VEHICLE SPATIAL PATH SAMPLING

(71) Applicant: Aurora Operations, Inc., Pittsburgh, PA (US)

(72) Inventors: David McAllister Bradley, Pittsburgh, PA (US); Chenggang Liu, Pittsburgh, PA (US); Daoyuan Jia, Pittsburgh, PA (US)

(73) Assignee: AURORA OPERATIONS, INC., Pitsburgh, PA (US)

( * ) Notice: Subject to any disclaimer, the term of this patent is extended or adjusted under 35 U.S.C. 154(b) by 83 days.

(21) Appl. No.: 18/674,442

(22) Filed: May 24, 2024

(65) Prior Publication Data
US 2024/0310835 A1    Sep. 19, 2024

Related U.S. Application Data

(63) Continuation of application No. 18/074,770, filed on Dec. 5, 2022, now Pat. No. 12,045,058, which is a continuation of application No. 16/832,758, filed on Mar. 27, 2020, now Pat. No. 11,520,338.

(60) Provisional application No. 62/982,436, filed on Feb. 27, 2020.

(51) Int. Cl.
*G05D 1/00*      (2024.01)
*B60W 60/00*     (2020.01)
*G05D 1/227*     (2024.01)
*G05D 1/646*     (2024.01)
*G05D 1/81*      (2024.01)

(52) U.S. Cl.
CPC ....... *G05D 1/0212* (2013.01); *B60W 60/0011* (2020.02); *G05D 1/0088* (2013.01); *G05D 1/227* (2024.01); *G05D 1/646* (2024.01); *G05D 1/81* (2024.01)

(58) Field of Classification Search
CPC ............... G05D 1/0212; G05D 1/0088; G05D 2201/0213
USPC ......................................................... 701/26
See application file for complete search history.

(56) References Cited

U.S. PATENT DOCUMENTS

| 10,379,538 | B1  |   | 8/2019  | Sheckells et al. |              |
|------------|-----|---|---------|------------------|--------------|
| 11,491,987 | B1  | * | 11/2022 | Ward             | B60W 30/18163|
| 12,012,104 | B2  | * | 6/2024  | Saito            | B60W 30/045  |
| 12,045,058 | B2  | * | 7/2024  | Bradley          | B60W 60/0011 |
| 12,065,172 | B2  | * | 8/2024  | Mell             | B60W 30/0956 |

(Continued)

*Primary Examiner* — Yazan A Soofi
(74) *Attorney, Agent, or Firm* — Dority & Manning, P.A.

(57) ABSTRACT

Systems and methods for vehicle spatial path sampling are provided. The method includes obtaining an initial travel path for an autonomous vehicle from a first location to a second location and vehicle configuration data indicative of one or more physical constraints of the autonomous vehicle. The method includes determining one or more secondary travel paths for the autonomous vehicle from the first location to the second location based on the initial travel path and the vehicle configuration data. The method includes generating a spatial envelope based on the one or more secondary travel paths that indicates a plurality of lateral offsets from the initial travel path. And, the method includes generating a plurality of trajectories for the autonomous vehicle to travel from the first location to the second location such that each of the plurality of trajectories include one or more lateral offsets identified by the spatial envelope.

20 Claims, 11 Drawing Sheets

(56) References Cited

U.S. PATENT DOCUMENTS

| | | |
|---|---|---|
| 12,077,181 B1 * | 9/2024 | Costantino ......... B60W 60/0011 |
| 12,172,645 B2 * | 12/2024 | Harada ................ G06V 20/588 |
| 12,391,273 B2 * | 8/2025 | Zhao ............... B60W 30/18163 |
| 2013/0313735 A1 | 11/2013 | Tan et al. |
| 2016/0313737 A1 * | 10/2016 | Berkemeier ......... G05D 1/0212 |
| 2019/0317511 A1 | 10/2019 | Xu et al. |
| 2019/0361450 A1 | 11/2019 | Sheckells et al. |
| 2020/0180612 A1 | 6/2020 | Finelt et al. |
| 2021/0004004 A1 | 1/2021 | Whitfield, Jr. et al. |
| 2021/0122379 A1 | 4/2021 | Choi et al. |
| 2021/0271245 A1 | 9/2021 | Bradley et al. |
| 2022/0083065 A1 | 3/2022 | Liu et al. |
| 2022/0227373 A1 | 7/2022 | Harouche et al. |

\* cited by examiner

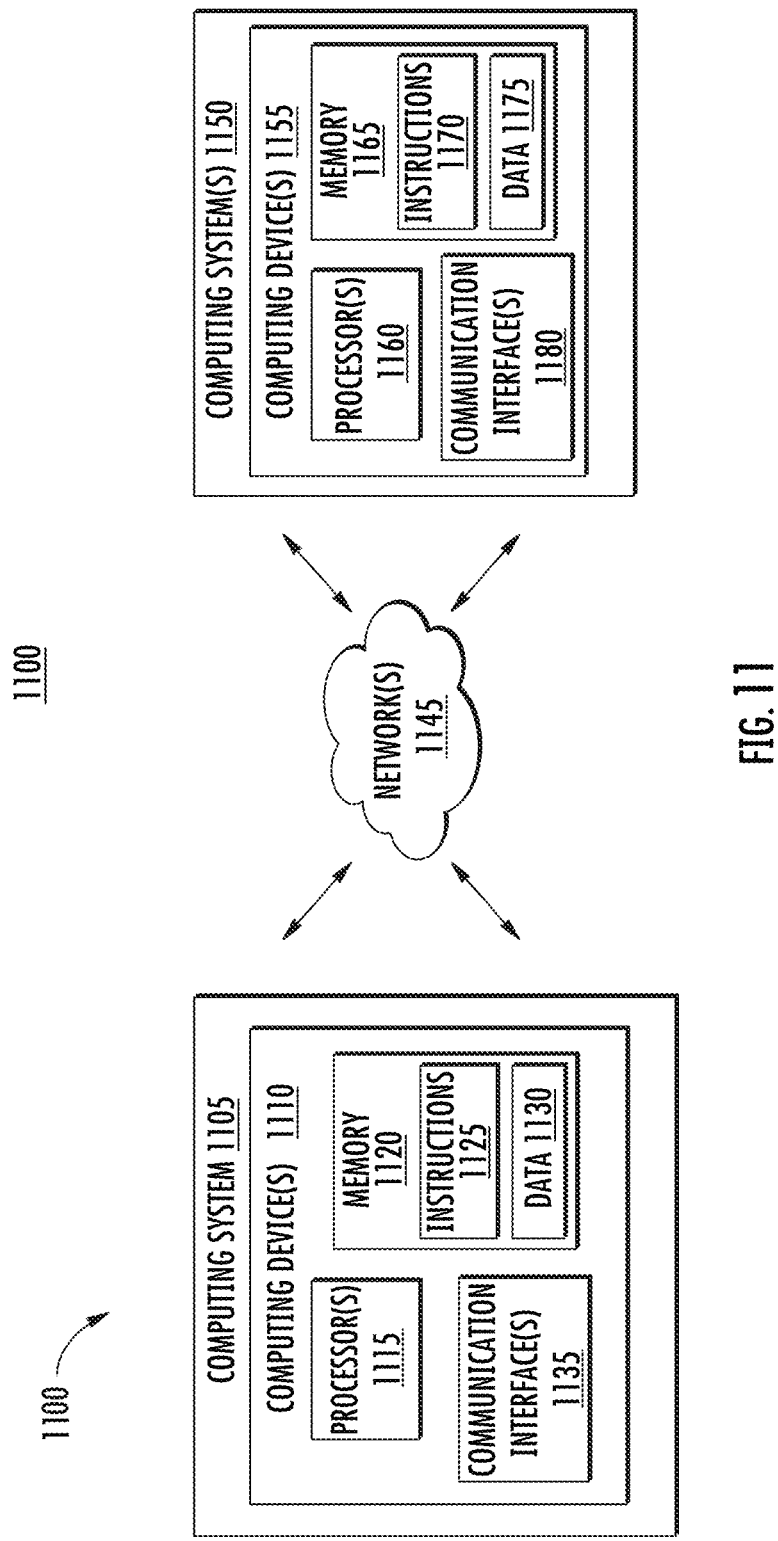

SYSTEMS AND METHODS FOR VEHICLE SPATIAL PATH SAMPLING

RELATED APPLICATION

The present application is a continuation of U.S. Non-Provisional patent application Ser. No. 18/074,770 having a filing date of Dec. 5, 2022, which is a continuation of U.S. Non-Provisional patent application Ser. No. 16/832,758 having a filing date of Mar. 27, 2020 (now issued with U.S. Pat. No. 11,520,338 on Dec. 6, 2022), which is based on and claims benefit of U.S. Provisional Patent Application No. 62/982,436 having a filing date of Feb. 27, 2020. Applicant claims priority to and the benefit of each of such applications and incorporates all such applications herein by reference in its entirety.

FIELD

The present disclosure relates generally to vehicle motion planning. In particular, a vehicle motion plan can be created based on a number of potential trajectories generated for the vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a computing system including one or more computing devices, a basis path indicative of an initial travel path for an autonomous vehicle from a first location to a second location. The method includes obtaining, by the computing system, vehicle configuration data indicative of one or more physical constraints of the autonomous vehicle. The method includes determining, by the computing system, one or more secondary travel paths for the autonomous vehicle from the first location to the second location based, at least in part, on the basis path and the vehicle configuration data. The method includes generating, by the computing system, a spatial envelope based on the one or more secondary travel paths. The spatial envelope is indicative of a plurality of lateral offsets from the basis path. And, the method includes generating, by the computing system, a plurality of trajectories for the autonomous vehicle to travel from the first location to the second location based, at least in part, on the spatial envelope. Each of the plurality of trajectories include one or more lateral offsets identified by the spatial envelope.

Another example aspect of the present disclosure is directed a computing system including one or one or more processors and one or more tangible, non-transitory, computer readable media. The one or more tangible, non-transitory, computer readable media collectively store instructions that when executed by the one or more processors cause the computing system to perform operations. The operations include obtaining a basis path indicative of an initial travel path for an autonomous vehicle from a first location to a second location. The operations include obtaining vehicle configuration data indicative of one or more physical constraints of the autonomous vehicle. The operations include determining one or more secondary travel paths for the autonomous vehicle from the first location to the second location based, at least in part, on the basis path and the vehicle configuration data. The one or more secondary travel paths include at least one minimum travel path indicative of a travel path for the autonomous vehicle associated with a minimum viable curvature. The minimum viable curvature is indicative of a minimum viable driving angle for the autonomous vehicle based on the basis path and the vehicle configuration data. And, the one or more secondary travel paths include at least one maximum travel path indicative of a travel path for the autonomous vehicle associated with a maximum viable curvature. The maximum viable curvature is indicative of a maximum viable driving angle for the autonomous vehicle based on the basis path and the vehicle configuration data. And, the operations include generating a plurality of trajectories for the autonomous vehicle to travel from the first location to the second location based, at least in part, on the one or more secondary travel paths.

Yet another example aspect of the present disclosure is directed to an autonomous vehicle including one or one or more processors and one or more tangible, non-transitory, computer readable media. The one or more tangible, non-transitory, computer readable media collectively store instructions that when executed by the one or more processors cause the one or more processors to perform operations. The operations include obtaining a basis path indicative of an initial travel path for the autonomous vehicle from a first location to a second location. The operations include obtaining vehicle configuration data indicative of one or more physical capabilities of the autonomous vehicle. The operations include determining one or more secondary travel paths for the autonomous vehicle from the first location to the second location based, at least in part, on the basis path and the vehicle configuration data. The operations include generating a spatial envelope based on the one or more secondary travel paths. The spatial envelope includes a plurality of lateral offsets from the basis path. The operations include generating a plurality of trajectories for the autonomous vehicle to travel from the first location to the second location based, at least in part, on the spatial envelope. Each of the plurality of trajectories include one or more lateral offsets of the spatial envelope. And, the operations include determining a motion plan for the autonomous vehicle based at least in part on at least one of the plurality of trajectories.

Other example aspects of the present disclosure are directed to other systems, methods, vehicles, apparatuses, tangible non-transitory computer-readable media, and devices for determining a motion plan.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 11 depicts a block diagram of an example computing system according to example embodiments of the present disclosure.

DETAILED DESCRIPTION

Figure 1:
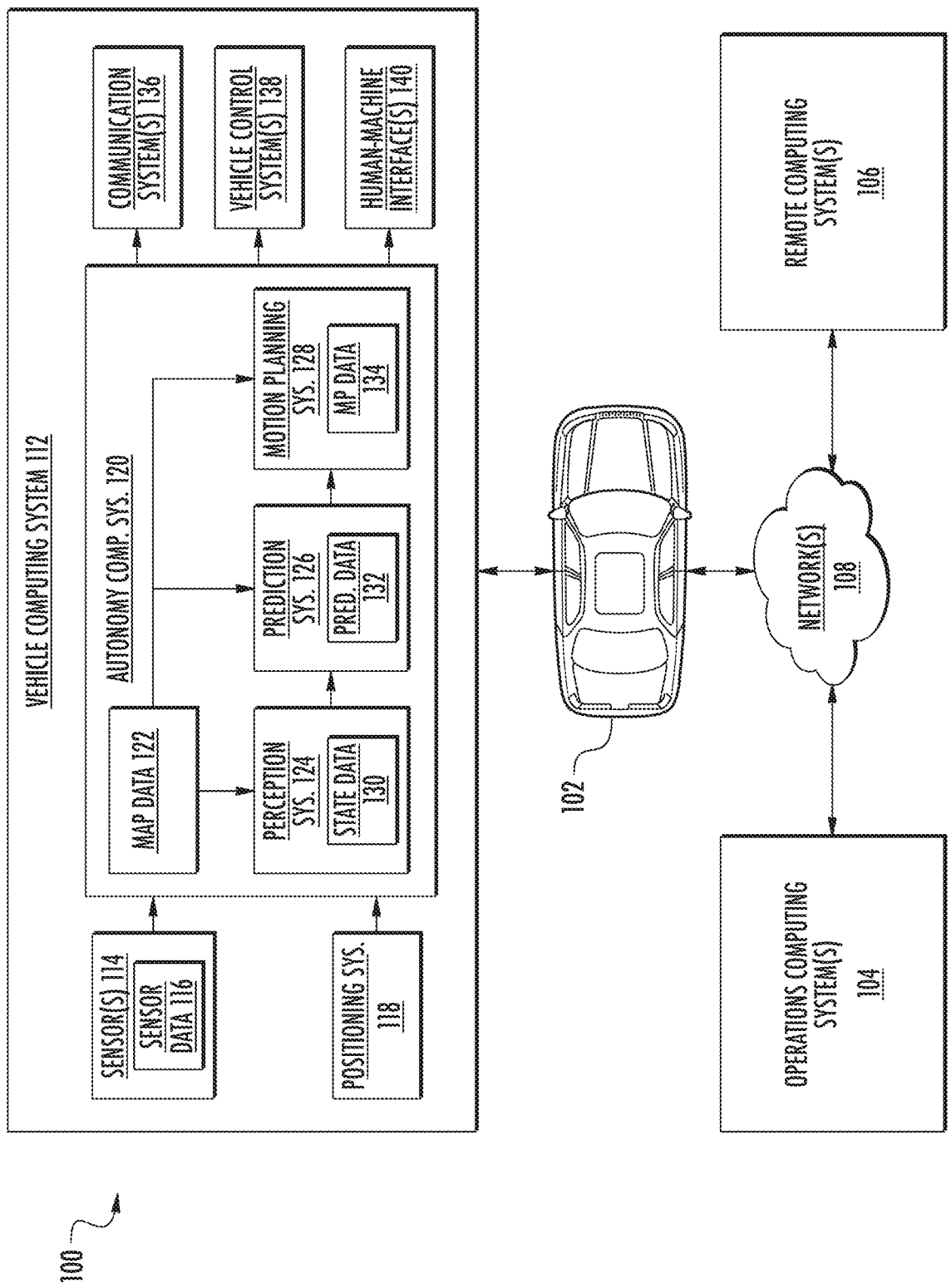
FIG. 1 depicts a block diagram of an example system for controlling the navigation of an autonomous vehicle according to example embodiments of the present disclosure.

Aspects of the present disclosure are directed to improved systems and methods for spatial path sampling such as, for example, spatial path sampling for autonomous vehicle motion planning. In particular, aspects of the present disclosure are directed to determining a motion plan based on a plurality of viable trajectories. To determine a motion plan, a vehicle computing system can generate a basis path from a first location to a second location based on map data without consideration of the context of a vehicle's surrounding environment (e.g., static (e.g., road signs, road blockades, etc.) or dynamic (e.g., other vehicles, pedestrians, etc.) objects near the vehicle at a current time, etc.). The vehicle computing system can generate a plurality of trajectories based on the basis path, combine each trajectory with a plurality speed profiles (e.g., an acceleration, velocity, etc. of the vehicle at each point in the trajectory), and determine a cost for each combination. The cost for each trajectory/speed profile combination can indicate a risk level such that the lowest cost trajectory can identify the optimal path of travel for the vehicle based on the map data and the surrounding environment of the vehicle at the current time. The vehicle computing system can identify the lowest cost trajectory/speed profile and generate a motion plan based on the trajectory and corresponding speed profile.

In order to conserve computing resources and reduce computing time devoted to determining a lowest cost trajectory, the vehicle computing system can filter and/or selectively generate the plurality of trajectories before determining a cost for each trajectory/speed profile combination. To do so, the vehicle computing system can obtain vehicle configuration data indicative of one or more capabilities (e.g., operational capabilities (e.g., restricted driving maneuvers, etc.), physical capabilities (e.g., twist steering angle, steering angle velocity, angular velocity, etc.) of the vehicle, determine a maximum viable driving angle and/or a minimum viable driving angle for the vehicle based on the capabilities, and generate a plurality of viable trajectories for the vehicle based on the minimum/maximum driving angles. The viable trajectories, for example, can be limited to those trajectories physically possible (and/or safe) for the autonomous vehicle to perform based on physical and/or operational limitations of the vehicle. For example, an autonomous vehicle can have a maximum turn radius (e.g., 34'-35') based on the wheelbase distance between the vehicle's front and rear axles. In such a case, the vehicle computing system can be configured to generate a plurality of viable trajectories (and/or filter a plurality of possible trajectories) associated with curvatures that do not violate the turning radius of the vehicle and cost each of the plurality of trajectories. In this manner, the vehicle computing system can conserve vehicle computing resources by limiting the number of trajectories for costing to those viable trajectories that are safe to perform. The viable trajectories thus correspond to a subset of the possible trajectories such that the total number of viable trajectories is less than the total number of possible trajectories, thereby reducing overall computational cost associated with costing trajectories during motion planning.

Moreover, to further distinguish viable trajectories from a plurality of possible trajectories, the vehicle computing system can determine secondary travel paths including a minimum travel path associated with the minimum driving angle of the vehicle (e.g., the lowest negative driving angle compared to the basis path, etc.) and a maximum travel path associated with the maximum driving angle of the vehicle (e.g., the highest positive driving angle compared to the basis path, etc.). The vehicle computing system can generate a spatial envelope indicative of a plurality of lateral offsets from the basis path based on the secondary travel paths. For example, the basis path can include a spatial path with a plurality of spatial points (e.g., a lateral value and a longitudinal value), each corresponding to a point in time. Each trajectory generated based on the basis path can include a plurality of lateral offsets (e.g., a lateral profile), each offset identifying a distance from a spatial point of the basis path at a corresponding point in time. The spatial envelope can be indicative of a plurality of valid lateral offsets between the minimum and maximum travel paths. The vehicle computing system can determine the plurality of viable trajectories based on the spatial envelope, such that each of the plurality of viable trajectories are made up of a combination of valid lateral offsets (e.g., valid lateral profiles, etc.). In this manner, the vehicle computing system can further reduce the number of trajectories analyzed for each basis path by ensuring that each trajectory is promising (e.g., physically possible for the autonomous vehicle to perform, etc.) before generating a trajectory/speed profile combination. This, in turn, can enable the vehicle computing system to devote additional computing resources to costing trajectories that are more likely to have a lower cost (e.g., impossible trajectories are associated with a high cost, etc.). In this way, the vehicle computing system can more efficiently identify lower cost trajectories, while reducing the computing resources and computing time wasted by costing irrelevant trajectories.

An autonomous vehicle (e.g., ground-based vehicle, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment. Additionally, the vehicle computing system can communicate with a remote computing system such as, for example, an operations computing system and/or one or more remote devices via a communication system onboard the vehicle. The operations computing system can be associated with a service entity that provides one or more vehicle services.

More particularly, an autonomous vehicle can include a vehicle computing system. The vehicle computing system can be responsible for, among other functions, creating the control signals needed to effectively control the autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data, and, based on the trajectories, transmit control signals to a vehicle control system to implement the trajectory. To accomplish these operations, the autonomy computing system can include a plurality of subsystems including a perception system, a prediction system, and a motion planning system, etc.

The vehicle computing system (e.g., the perception system) can access sensor data from one or more sensors to identify static objects and/or dynamic objects (actors) in the autonomous vehicle's environment. The vehicle computing system can use a positioning system and/or a communication system to determine its current location. The vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, basis paths, etc. The vehicle computing system can utilize the sensor data to identify one or more objects in the local environment of the autonomous vehicle (e.g., the vicinity surrounding the vehicle that is within a field of view or operational range of the sensors). The sensor data can include, for example, data acquired via camera sensors, LIDAR sensors, and RADAR sensors. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, the perception and prediction functions of the vehicle computing system can be included within the same system.

The vehicle computing system (e.g., motion planning system) can use the perception data, prediction data, map data, and/or other data to generate a motion plan for the vehicle. For example, a route can describe a specific path for the autonomous vehicle to travel from a current location to a destination location. The vehicle computing system can generate potential trajectories for the autonomous vehicle to follow as it traverses the route. Each potential trajectory can be executable by the autonomous vehicle (e.g., feasible for the vehicle control systems to implement). Each trajectory can be generated to include a specific amount of travel time (e.g., eight seconds, etc.). The vehicle computing system can select and implement a trajectory for the autonomous vehicle to navigate a specific segment of the route. For instance, the trajectory can be translated and provided to the vehicle control system(s) that can generate specific control signals for the autonomous vehicle (e.g., adjust steering, braking, velocity, etc.). The specific control signals can cause the autonomous vehicle to move in accordance with the selected trajectory.

The technology of the present disclosure provides improved systems and methods for generating and selecting a trajectory for a vehicle. This can allow the vehicle computing system to select a trajectory from a variety of potential trajectories to help ensure that the autonomous vehicle is traveling safely and comfortably.

To do so, the vehicle computing system (e.g., motion planning system, etc.) can obtain a basis path indicative of an initial travel path for an autonomous vehicle from a first location to a second location. The basis path, for example, can be obtained from a map repository (e.g., stored onboard the vehicle computing system, in a remote memory of one or more remote computing device communicatively connected to the vehicle computing system, etc.). By way of example, the vehicle computing system can determine a current location associated with the vehicle and obtain map data and one or more corresponding basis paths from the map repository based on the current location. The basis path (e.g., an initial travel path) can represent an ideal travel path from a first location to a second location. For example, the basis path can be based on the map data. By way of example, the map data can include information about a particular geographic location including one or more geographic features such as roads, boundaries (e.g., lane boundaries, curbs, etc.), buildings, information about expected traffic patterns, etc. The basis path can include a nominal path for the autonomous vehicle with respect to geographic features of the map data such as, for example, a path that maintains the position of the autonomous vehicle within the lane boundaries of a travel way (e.g., lane lines on a road, etc.) as identified by the map data. The basis path can include a travel path from the first location to the second location without regard of any objects not included in the map data. By way of example, the ideal travel path can be determined without knowledge of the current surrounding environment of the vehicle and one or more static or dynamic object(s) therein.

In this regard, the basis path can be pre-determined and/or dynamically determined in real-time for a particular geographic area. As an example, the basis path can be pre-determined for the particular geographic area and stored (e.g., before the autonomous vehicle arrives in that particular geographic area). For instance, data indicative of the basis path can be stored (e.g., while the vehicle is offline) in one or more remote computing devices, servers, etc. The data indicative of the basis path can be obtained by the vehicle computing system (e.g., via the one or more remote computing devices, servers, etc.). For example, the data indicative of the basis path can be encoded as a feature of map data obtained by the vehicle computing system. In addition, or alternatively, the basis path can be determined in real-time as the autonomous vehicle is traveling. For example, the vehicle computing system (e.g., motion planning system, etc.) and/or one or more remote computing systems communicatively connected to the vehicle computing system can obtain map data based on the surrounding environment of the autonomous vehicle and determine the basis path based on the map data.

The initial travel path of the basis path for the autonomous vehicle can include a plurality of spatial points (e.g., geographic coordinates, map coordinates, etc.) corresponding to one or more times. For example, the initial travel path can be associated with an overall travel time indicative of an expected duration of time to travel from the first location to the second location. For instance, the travel time can be associated with a planning cycle of the vehicle computing system (e.g., motion planning system, etc.). Each of the plurality of spatial points can correspond to a point in time (e.g., 2 s, 5 s, 10 s, etc.) within the overall travel time (e.g., 15 s, etc.).

In addition, or alternatively, the initial travel path for the autonomous vehicle can be associated with a basis path curvature. In some implementations, the vehicle computing system can be configured to determine the basis path curvature. The basis path curvature, for example, can be based, at least in part, on the plurality of spatial coordinates. For instance, the basis path curvature can include one or more angles formed by a plurality of consecutive spatial points of the initial travel path. By way of example, an initial travel path with a plurality of consecutive spatial points forming a straight line over time can be associated with a basis path curvature of zero degrees and/or 180 degrees. As another example, an initial travel path with a plurality of consecutive spatial points forming one or more curves over time can include one or more angles (e.g., negative angles (e.g., −5 degrees, −10 degrees, etc.), positive angles (e.g., 5 degrees, 10 degrees, etc.), etc.) corresponding to each curve. In some examples, the basis path curvature can include an angle value corresponding to each of the plurality of spatial coordinates forming the initial travel path.

The vehicle computing system can determine a plurality of trajectories based on the basis path. For example, a trajectory can be defined by a spatial path (e.g., latitude value (x), longitude value (y), yaw, curvature, etc.) and/or steering quantities (e.g., wrench, twist, steering angle, steering angle velocity, angular velocity, lateral speed, lateral acceleration, lateral jerk, etc.) required to implement the spatial path. Each trajectory can be associated with the overall travel time (e.g., 5 s, 8 s, 10 s, etc.) of the initial travel path. For example, each trajectory can include an offset spatial path indicative of a plurality of spatial points corresponding to one or more points in time within the travel time.

A trajectory can include an offset profile including a plurality of offset values. Each offset value can represent a distance and direction that the respective trajectory differs from the initial travel path at one or more times during the initial travel path. For example, a particular offset value can indicate that at a time 3 seconds into the path, the respective trajectory places the autonomous vehicle 0.7 meters north of the initial travel path. In some implementations, the offset profile can be represented as a line on a graph wherein one axis on the graph represents the degree and direction of lateral variation from the initial travel path and the other axis represents time. Each offset profile can be mapped onto the initial travel path to generate one or more trajectories. Thus, each trajectory can follow the general path of the initial travel path with one or more lateral adjustments. The vehicle computing system can generate a large number of potential trajectories for the vehicle, such that most, if not all, possible paths are represented as a lateral deviation from the initial travel path. This allows many additional alternatives to quickly and efficiently be considered, while still maintaining a high degree of safety for the autonomous vehicle. For example, if the initial travel path can be represented as a path through an environment, the offset profile for a particular trajectory can be represented as a path that follows the general route of the initial travel path but is offset laterally along the initial travel path distance. The degree to which the particular trajectory is laterally offset from the initial travel path can be represented as a function of time.

The vehicle computing system can determine a plurality of speed profiles (e.g., a speed, acceleration, velocity, etc. for each lateral offset of a respective trajectory) for each respective trajectory of the plurality of trajectories and determine a cost for each possible combination of trajectories and speed profiles based, at least in part, on sensor data indicative of the surrounding environment of the vehicle. For instance, the vehicle computing system can score each trajectory/speed profile against a cost function that ensures safe, efficient, and comfortable vehicle motion. The cost functions can be encoded for the avoidance of object collision, for the autonomous vehicle to stay on the travel way/within lane boundaries, prefer gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can also, or alternatively, take into account at least one of the following object cost(s): collision costs (e.g., cost of avoiding/experience potential collision, minimization of speed, etc.); overtaking buffer (e.g., give 4 ft of space with overtaking a bicycle, etc.); headway (e.g., preserve stopping distance when applying adaptive cruise control motion to a moving object, etc.); actor caution (e.g., preserve the ability to stop for unlikely events, etc.); behavioral blocking (e.g., avoid overtaking backed-up traffic in vehicle lane, etc.); or other parameters. In some implementations, the cost function(s) can account for fixed buffer and/or speed dependent buffers (e.g., requiring more space for actors when the vehicle is passing at higher speeds, etc.). In some implementations, the cost function(s) can account for map geometry features such as the distance from the initial travel path, the location of lane boundaries, and road boundaries, etc. It should be appreciated that although the subject technology is described in terms of cost functions and reducing or minimizing cost, such functions could alternatively be determined as reward functions that are increased or maximized.

The amount of computing time and resources devoted to determining a cost for the plurality of trajectories increases as a function of the number of trajectories costed. Thus, in some implementations, the vehicle computing system (e.g., motion planning system, etc.) can filter and/or selectively generate a plurality of trajectories based on one or more factors indicative of a likelihood that the trajectory will have a low cost. For example, the vehicle computing system can filter and/or selectively generate the plurality of trajectories based on vehicle configuration data. To do so, the vehicle computing system can obtain vehicle configuration data associated with the vehicle. The vehicle configuration data, for example, can be indicative of one or more operational and/or physical capabilities of the vehicle. The one or more operational and/or physical capabilities of the vehicle can be utilized to determine one or more vehicle curvature limitations of the vehicle.

By way of example, the one or more physical capabilities of the vehicle can include a maximum twist steering angle, maximum steering angle velocity, maximum angular velocity, etc. The one or more physical capabilities can be based on one or more physical characteristics (e.g., type of tire, number of doors, weight, wheelbase distance between front and rear axles, front wheel drive, rear wheel drive, etc.) of the vehicle.

The one or more physical capabilities can be dynamically determined based on current sensor data and/or predetermined during the provisioning of the vehicle. By way of example, the one or more physical capabilities can be preset based on the vehicle type (e.g., make, model, year, etc.) and/or safety standards (e.g., governmental regulations, etc.) associated with the vehicle. In addition, or alternatively, the one or more physical capabilities can be dynamically determined and/or altered based on environmental data (e.g., weather data, etc.) and/or a current condition of one or more physical components of the vehicle (e.g., current wear and tear, etc.). In this manner, the physical capabilities of the vehicle can change over time to more accurately reflect the capabilities of the vehicle at a current time.

In addition, or alternatively, the vehicle can be associated with one or more operational capabilities. Operational capabilities can include, for example, one or more driving capabilities indicative of a type of autonomous vehicle and/or a vehicle operator associated with the vehicle. For example, a vehicle operational capability can be a feature, function, and/or behavior of the vehicle. For instance, an operational capability can be indicative of one or more restricted driving maneuvers the autonomous vehicle is unable to perform and/or one or more permitted driving maneuvers that the autonomous vehicle is able to perform. The operational capabilities can include, for example, speed limits and directions (e.g., conformity to specified speed limits, directions of travel, lane restrictions, etc.); stop and go traffic (e.g., ability to properly handle dense traffic conditions with frequent slow-downs, starts, stops, etc.); turning radius (e.g., ability to handle left hand turns, unprotected turns, three point turns, U-turns, etc.); parking (e.g., parallel parking, required parking space dimensions, etc.); navigating certain geographic features (e.g., crossing train tracks); traveling in reverse (e.g., backing into a parking space); signaling (e.g., handling turn signal(s) from other objects); nudging; handling jaywalkers; and/or other capabilities of a vehicle. In some implementations, the one or more physical capabilities of the vehicle can be determined based, at least in part, on operational capabilities of the vehicle, and/or vice versa. For example, the one or more physical capabilities can be indicative of one or more physical limitations based on the operational capabilities of the vehicle, and/or vice versa.

The vehicle computing system (e.g., motion planning system, etc.) can determine one or more secondary travel paths for the autonomous vehicle from the first location to the second location based on the basis path, the vehicle configuration data, and/or map data (e.g., lane features such as curbs and/or other roadway features). The one or more secondary travel paths can include spatial path offsets from the initial travel path. For example, the secondary travel paths can include a plurality of secondary spatial points, each secondary spatial point being a distance and/or direction from a spatial point of the initial travel path. The secondary travel paths can include a minimum and/or maximum travel path. The minimum and/or maximum travel paths can be associated with a minimum and/or maximum driving angle for the vehicle. The minimum and/or maximum driving angles, for example, can be determined based on the basis path, vehicle configuration data, and/or map data.

By way of example, the minimum and/or maximum travel paths and/or driving angles can be determined based, at least in part, on road and/or obstacle limitations as indicated by the map data. For instance, the minimum and/or maximum travel paths and/or driving angles can be defined by a curb or other roadway features (e.g., railing, tunnel wall, etc.). In addition, the minimum and/or maximum travel paths and/or driving angles can be determined based on one or more objects and/or obstacles. For instance, the minimum and/or maximum travel paths and/or driving angles can be defined such that they avoid one or more obstacles such as, for example, fallen trees, potholes, and any other object or roadway obstacle.

For example, the vehicle computing system can determine a minimum viable driving angle for the vehicle based on the basis path and the vehicle configuration data. The minimum viable driving angle can be indicative of the lowest possible turning radius of the vehicle that, if performed by the vehicle, will keep the vehicle within a current travel lane (while avoiding any obstacles) without violating any physical or operational constraints of the vehicle at any point during the overall travel time. For example, the minimum viable driving angle can be determined based on a minimum twist steering angle, a steering angle velocity, an angular velocity, etc. that the vehicle is capable of performing while remaining in the vehicle's current lane.

In addition, or alternatively, the vehicle computing system can determine a maximum viable driving angle for the vehicle based on the basis path and the vehicle configuration data. The maximum viable driving angle can be indicative of the highest possible turning radius of the vehicle that, if performed by the vehicle, will keep the vehicle within the lane (while avoiding any obstacles) without violating any physical or operational constraints of the vehicle at any point during the overall travel time. By way of example, the maximum viable driving angle can be determined based on a maximum steering angle velocity, twist steering angle, angular velocity, etc. that the vehicle is capable of performing while remaining in the vehicle's current lane.

The minimum travel path for the vehicle during the travel time can be indicative of a travel path (e.g., a plurality of secondary spatial points) for the vehicle that is associated with a minimum curvature. The minimum curvature, for example, can be indicative of the minimum viable curvature for a travel path from the first location to the second location based on the minimum viable driving angle for the autonomous vehicle during the overall travel time. In this manner, the minimum viable curvature can be indicative of the minimum viable driving angle for the vehicle during the overall travel time. The maximum travel path for the vehicle during the travel time can be indicative of a travel path (e.g., a plurality of secondary spatial points) for the vehicle that is associated with a maximum curvature. The maximum curvature, for example, can be indicative of the maximum viable curvature for a travel path from the first location to the second location based on the maximum viable driving angle for the vehicle during the overall travel time. In this manner, the maximum viable curvature can be indicative of the maximum viable driving angle for the vehicle during the overall travel time.

In some implementations, the vehicle computing system (e.g., motion planning system, etc.) can generate (and/or filter) a plurality of trajectories for the autonomous vehicle to travel from the first location to the second location based, at least in part, on the one or more secondary travel paths. For instance, each of the plurality of trajectories can be associated with a curvature (e.g., determined based on consecutive spatial points of the trajectory). The vehicle computing system can generate (and/or filter) each of the plurality of trajectories such that each trajectory is associated with one or more curvatures between the minimum viable curvature and the maximum viable curvature. For example, the vehicle computing system (e.g., motion planning system, etc.) can generate the plurality of trajectories for the autonomous vehicle by identifying one or more trajectories associated with one or more curvatures less than or equal to the maximum viable curvature and/or greater than or equal to the minimum viable curvature.

In addition, or alternatively, the vehicle computing system (e.g., motion planning system, etc.) can generate a spatial envelope based on the one or more secondary travel paths. For instance, the vehicle computing system can convert the valid curvature values (e.g., minimum viable curvature, maximum viable curvature, etc.) associated with the one or more secondary travel paths (e.g., minimum travel path, maximum travel path, etc.) into an envelope of reachable space (e.g., the spatial envelope). To do so, the vehicle computing system can identify one or more minimum and/or maximum spatial points associated with the one or more secondary travel paths. The one or more minimum spatial points, for example, can be indicative of the one or more spatial points that form the minimum viable curvature of the minimum travel path for the vehicle. The one or more maximum spatial points, for example, can be indicative of the one or more spatial points that form the maximum viable curvature of the maximum travel path.

The vehicle computing system can convert the minimum spatial points into one or more minimum lateral offsets. The one or more minimum lateral offsets, for example, can include a minimum lateral offset for each point in time during the travel time. By way of example, each minimum lateral offset at a respective point in time can be indicative of the furthest negative distance and/or direction from a spatial point of the basis path at the respective point in time. In addition, or alternatively, the vehicle computing system can convert the maximum spatial points into one or more maximum lateral offsets. The one or more maximum lateral offsets, for example, can include a maximum lateral offset for each point in time during the travel time. By way of example, each maximum lateral offset at a respective point in time can be indicative of the furthest positive distance and/or direction from a spatial point of the basis path at the respective point in time.

The spatial envelope can be indicative of a plurality of lateral offsets from the basis path. Each lateral offset of the plurality of lateral offsets can include a distance and/or direction from at least one of the plurality of spatial points (e.g., geographic coordinates, map coordinates, etc.) of the initial travel path at one or more times corresponding to the at least one of the plurality of spatial points. For instance, the spatial envelope can include a representation of each of the maximum and minimum lateral offsets such that the space between the minimum and maximum lateral offsets represent valid lateral offsets reachable by the vehicle. In this manner, the spatial envelope can identify a plurality of lateral offsets indicative of a plurality of spatial coordinates at each point in time within the overall travel time.

The vehicle computing system (e.g., motion planning system, etc.) can determine a plurality of valid lateral offsets based, at least in part, on the spatial envelope. The plurality of valid lateral offsets can include, for example, each lateral offset identified within the spatial envelope. By way of example, the plurality of valid lateral offsets can include a lateral offset for each spatial coordinate between the minimum lateral offset and the maximum lateral offset at any point in time during the overall travel time. Thus, each valid lateral offset of the plurality of valid lateral offsets can be indicative of one or more spatial coordinates at a corresponding time.

The vehicle computing system (e.g., motion planning system, etc.) can generate (and/or filter) the plurality of trajectories for the vehicle to travel from the first location to the second location based on the spatial envelope. As an example, each trajectory of the plurality of trajectories can include a lateral profile indicative of one or more lateral offsets and each lateral profile can include a lateral offset for each point in time during the overall travel time. The vehicle computing system can determine a plurality of valid lateral offsets based on the spatial envelope and generate (and/or filter) the plurality of trajectories using the plurality of valid lateral offsets.

For example, the vehicle computing system can generate a plurality of valid lateral profiles, each valid lateral profile including a valid lateral offset for each point in time within the overall travel time. The vehicle computing system can generate a plurality of trajectories that correspond to the plurality of valid lateral profiles. In this manner, the vehicle computing system can generate a plurality of trajectories for the vehicle to travel from the first location to the second location based on the spatial envelope, with each of the plurality of trajectories including one or more lateral offsets identified by the spatial envelope. Each of the plurality of trajectories can be associated with one or more spatial coordinates (e.g., as identified by the valid lateral offsets) that are reachable by the vehicle without causing the vehicle to violate any operational or physical capabilities or leave a lane in which the vehicle is currently travelling. For instance, each of the plurality of trajectories can be associated with a curvature between the minimum viable curvature and the maximum viable curvature.

In addition, or alternatively, the vehicle computing system can determine a plurality of speed profiles (e.g., a speed, acceleration, velocity, etc. for each lateral offset of a respective trajectory) for each respective trajectory of the plurality of trajectories determined from the spatial envelope. For instance, the vehicle computing system can generate and/or filter the plurality of speed profiles (e.g., a velocity profile) based on each respective trajectory of the plurality of trajectories determined from the spatial envelope. Each of the plurality of speed profiles can be tailored to at least one respective trajectory of the plurality of trajectories such that the speed profile (when combined with the respective trajectory), if performed by the vehicle, will keep the vehicle within a current travel lane (while avoiding any obstacles) without violating any physical or operational constraints of the vehicle at any point during the overall travel time. In this manner, the trajectories provided by the spatial envelope can also limit speed profiles determined during velocity selection.

The vehicle computing system (e.g., vehicle control system, etc.) can control a motion of the autonomous vehicle based, at least in part, on at least one of the plurality of trajectories. For example, the vehicle computing system (e.g., motion planning system, etc.) can determine a lowest cost trajectory of the plurality of trajectories for the vehicle to travel from the first location to the second location. The vehicle computing system (e.g., motion planning system, etc.) can determine one or more control inputs to implement the lowest cost trajectory. In some implementations, the vehicle computing system can provide the one or more control inputs to a vehicle control system to utilize in controlling the motion of the vehicle.

Example aspects of the present disclosure can provide a number of improvements to computing technology such as, for example, vehicle motion planning technology. For instance, the systems and methods of the present disclosure provide an improved approach for determining a viable motion plan for autonomous driving. In particular, the systems and methods of the present disclosure can optimize motion planning performance while reducing computational cost. These improvements can be realized by evaluating the total number of trajectories generated and/or costed, the total cost associated with an identified lowest cost trajectory, and/or a cost regret metric that measures deviation of the lowest cost trajectory from an optimal theoretical solution. By filtering and/or selectively generating trajectories as disclosed herein, the systems and methods of the present disclosure can reduce the total number of trajectories generated and/or costed to those trajectories that can be feasibly performed by a vehicle. In this manner, the system and methods of the present disclosure can enable the evaluation of trajectories more likely to have a lower cost function. This, in turn, allows the systems and methods disclosed herein to identify lower cost trajectories, thereby reducing the deviation of the lowest cost trajectory from the optimal theoretical solution.

For example, a computing system can obtain a basis path indicative of an initial travel path for an autonomous vehicle from a first location to a second location. The computing system can obtain vehicle configuration data indicative of one or more physical constraints of the autonomous vehicle. The computing system can determine one or more secondary travel paths for the autonomous vehicle from the first location to the second location based, at least in part, on the basis path and the vehicle configuration data. The computing system can generate a spatial envelope based on the one or more secondary travel paths. The spatial envelope, for example, can be indicative of a plurality of lateral offsets from the basis path. And, the computing system can generate a plurality of trajectories for the autonomous vehicle to travel from the first location to the second location based, at least in part, on the spatial envelope. Each of the plurality of trajectories, for example, can include one or more lateral offsets identified by the spatial envelope. By limiting the plurality of trajectories to those including lateral offsets identified by the spatial envelope, the computing system can reduce processing resources devoted to costing the plurality of trajectories. The systems and methods of the present disclosure can be practically applied to motion planning systems in any object to filter and/or selectively generate potential trajectories based on the physical and/or operational limitations unique to the object. This, in turn, can decrease the plurality of trajectories available for evaluation and thus, decrease the computing resources needed to evaluate each of the plurality of trajectories. Ultimately the improved motion planning techniques disclosed herein can increase the speed and efficiency of computing systems in general by allowing motion planning systems to generate viable motion plans with less computing resources.

Furthermore, although aspects of the present disclosure focus on the application of motion planning techniques described herein to autonomous vehicles, the systems and methods of the present disclosure can be used to determine motion plans for any robot configured to move within a surrounding environment.

Various means can be configured to perform the methods and processes described herein. For example, a computing system can include data obtaining unit(s), secondary path unit(s), minimum path unit(s), maximum path unit(s), spatial envelope unit(s), valid lateral offset unit(s), viable trajectory unit(s), control unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain a basis path indicative of an initial travel path for an autonomous vehicle from a first location to a second location. In addition, the means (e.g., data obtaining unit(s), etc.) can be configured to obtain vehicle configuration data indicative of one or more physical constraints of the autonomous vehicle.

The means (e.g., secondary paths unit(s), etc.) can be configured to determine one or more secondary travel paths for the autonomous vehicle from the first location to the second location based, at least in part, on the basis path and the vehicle configuration data. The means (e.g., minimum path unit(s), etc.) can be configured to identify at least one minimum travel path indicative of a travel path for the autonomous vehicle associated with a minimum curvature. The minimum curvature can be indicative of a minimum viable driving angle for the autonomous vehicle based on the basis path and the vehicle configuration data. The means (e.g., maximum path unit(s), etc.) can be configured to identify at least one maximum travel path indicative of a travel path for the autonomous vehicle associated with a maximum curvature. The maximum curvature can be indicative of a maximum viable driving angle for the autonomous vehicle based on the basis path and the vehicle configuration data.

The means (e.g., spatial envelope unit(s), etc.) can be configured to generate a spatial envelope based on the one or more secondary travel paths. The spatial envelope can be indicative of a plurality of lateral offsets from the basis path. The means (e.g., valid lateral offset unit(s), etc.) can be configured to determine one or more valid lateral offsets based on the spatial envelope.

The means (e.g., viable trajectory unit(s), etc.) can be configured generate a plurality of trajectories for the autonomous vehicle to travel from the first location to the second location based, at least in part, on the spatial envelope. Each of the plurality of trajectories can include one or more lateral offsets indicated by the spatial envelope. The means (e.g., control unit(s), etc.) can be configured to control a motion of the autonomous vehicle based, at least in part, on at least one of the plurality of trajectories.

With reference now to FIGS. 1-10, example embodiments of the present disclosure will be discussed in further detail. FIG. 1 depicts an example system 100 overview according to example implementations of the present disclosure. As illustrated, FIG. 1 shows a system 100 that includes a communications network 108; an operations computing system 104; one or more remote computing devices 106; a vehicle 102; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108. For example, the one or more remote computing devices 106 can request the location of the vehicle 102 or a state of one or more objects detected by the one or more sensors 114 of the vehicle 102, via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver. The vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

In some implementations, the vehicle 102 can be associate with vehicle configuration data. The vehicle configuration data, for example, can be indicative of one or more operational and/or physical capabilities of the vehicle. By way of example, the one or more physical capabilities of the vehicle can include a maximum twist steering angle, maximum steering angle velocity, maximum angular velocity, etc. The one or more physical capabilities can be based on one or more physical characteristics (e.g., type of tire, number of doors, weight, wheelbase distance between front and rear axles, front wheel drive, rear wheel drive, etc.) of the vehicle 102.

The one or more physical capabilities can be dynamically determined based on current sensor data (e.g., collected by one or more sensors 114 as described below) and/or predetermined during the provisioning of the vehicle 102. By way of example, the one or more physical capabilities can be preset based on the vehicle type (e.g., make, model, year, etc.) and/or safety standards (e.g., governmental regulations, etc.) associated with the vehicle 102. In addition, or alternatively, the one or more physical capabilities can be dynamically determined and/or altered based on environmental data (e.g., weather data, etc.) and/or a current condition of one or more physical components of the vehicle (e.g., current wear and tear, etc.). In this manner, the physical capabilities of the vehicle can change over time to more accurately reflect the capabilities of the vehicle at a current time.

In addition, or alternatively, the vehicle can be associated with one or more operational capabilities. Operational capabilities can include, for example, one or more driving capabilities indicative of a type of autonomous vehicle and/or a vehicle operator associated with the vehicle 102. For example, a vehicle operational capability can be a feature, function, and/or behavior of the vehicle. For instance, an operational capability can be indicative of one or more restricted driving maneuvers an autonomous vehicle is unable to perform and/or one or more permitted driving maneuvers that the autonomous vehicle is able to perform. The operational capabilities can include, for example, speed limits and directions (e.g., conformity to specified speed limits, directions of travel, lane restrictions, etc.); stop and go traffic (e.g., ability to properly handle dense traffic conditions with frequent slow-downs, starts, stops, etc.); turning radius (e.g., ability to handle left hand turns, unprotected turns, three point turns, U-turns, etc.); parking (e.g., parallel parking, required parking space dimensions, etc.); navigating certain geographic features (e.g., crossing train tracks); traveling in reverse (e.g., backing into a parking space); signaling (e.g., handling turn signal(s) from other objects); nudging; handling jaywalkers; and/or other capabilities of a vehicle. In some implementations, the one or more physical capabilities of the vehicle can be determined based, at least in part, on operational capabilities of the vehicle, and/or vice versa. For example, the one or more physical capabilities can be indicative of one or more physical limitations based on the operational capabilities of the vehicle, and/or vice versa.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 102 (e.g., its computing system, one or more processors, and other devices in the vehicle 102) to perform operations and/or functions, including those described herein for obtaining a basis path for the vehicle 102 to travel and vehicle configuration data indicative of the physical capabilities of the vehicle 102, determining secondary paths based on the basis path and vehicle configuration data, generating a spatial envelope based on the secondary paths, generating a plurality of trajectories for the vehicle 102 to travel based on the spatial envelope, and, as described in further detail below, determining a motion plan for the vehicle 102 based on at least one of the plurality of trajectories. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 102. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 102. In this manner, the prediction system 126 can determine the future trajectory of the object within the surrounding environment of the vehicle 102 based, at least in part, on the machine-learned prediction generator model.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touch-screen display device associated with the one or more human-machine interfaces to indicate, for example, a stopping location for the vehicle 102.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 102. For example, the vehicle computing system 112 can send one or more control signals to activate one or more vehicle systems that can be used to control and/or direct the travel path of the vehicle 102 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 102 (e.g., auditory and/or visual messages about the state or predicted state of objects external to the vehicle 102); braking systems; propulsion systems that can be used to change the acceleration and/or velocity of the vehicle which can include one or more vehicle motor or engine systems (e.g., an engine and/or motor used by the vehicle 102 for locomotion); and/or steering systems that can change the path, course, and/or direction of travel of the vehicle 102.

Figure 2:
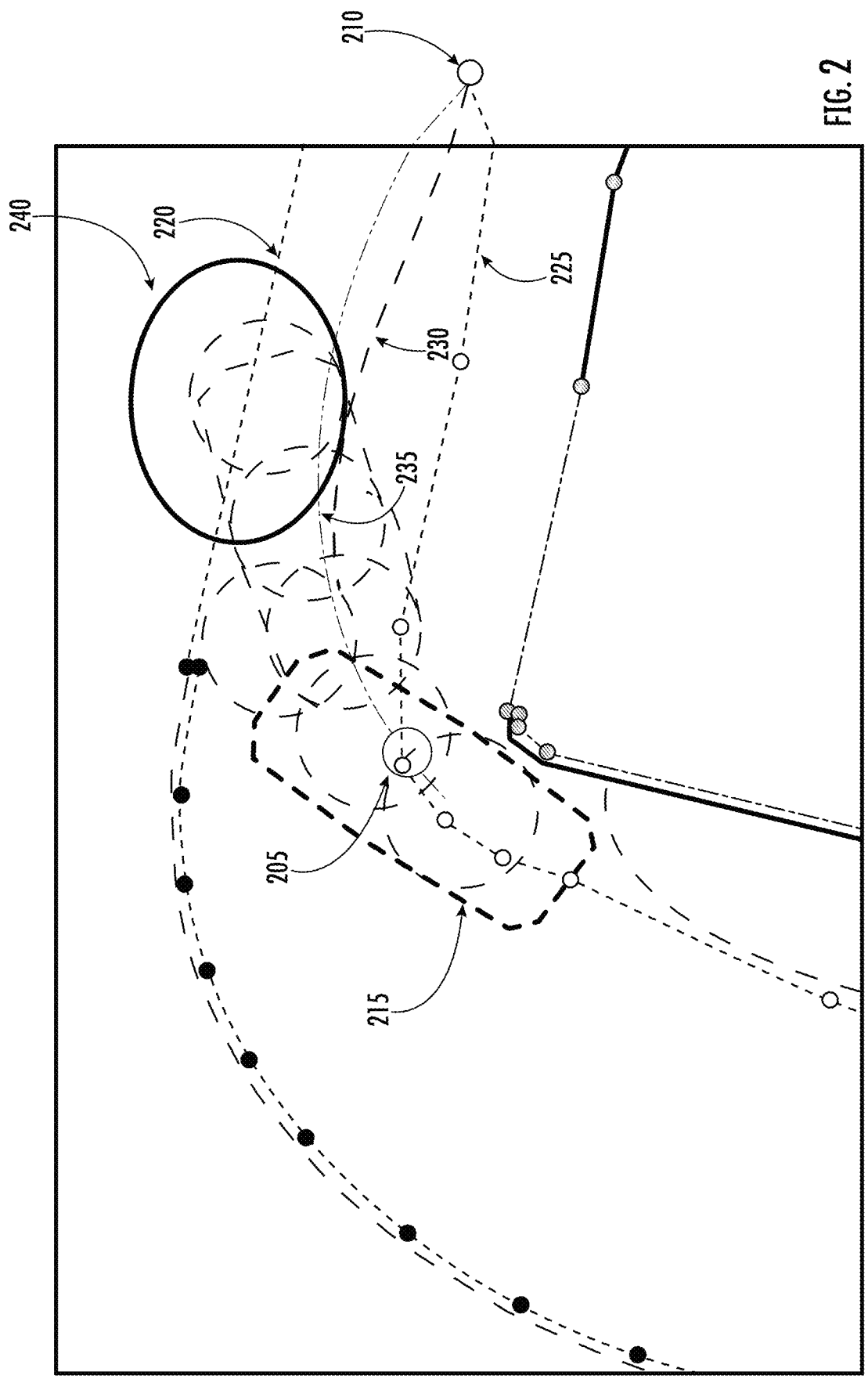
FIG. 2 depicts an illustration of a vehicle trajectory from a first location to a second location according to example embodiments of the present disclosure.

Turning to FIG. 2, FIG. 2 depicts an illustration 200 of a vehicle trajectory from a first location 205 to a second location 210 according to example embodiments of the present disclosure. The illustration 200 includes a first location 205, a second location 210, a vehicle shape 215, and a lane boundary 220. In addition, the illustration 200 depicts a route 225 that includes the first location 205 and the second location 210, a basis path 230 from the first location 205 to the second location 210, and a violation path 235 from the first location 205 to the second location 210 that includes a lane boundary violation 240.

For example, the route 225 can describe a specific path for a vehicle to travel from a current location to a destination location. The route 225 can include a plurality of route segments, such as the route segment of FIG. 2 from the first location 205 to the second location 210. A vehicle computing system can generate potential trajectories for the vehicle to follow as it traverses the route 225. For instance, the vehicle computing system can generate the potential trajectories for each route segment of the route. Each potential trajectory can include a path of travel for the vehicle during a respective route segment.

More particularly, a potential trajectory can be executable by an autonomous vehicle (e.g., vehicle 102). For example, each potential trajectory can be feasible for vehicle control systems of an autonomous vehicle to implement. Each trajectory can be generated to include a specific amount of travel time (e.g., eight seconds, etc.). The vehicle computing system can select and implement a trajectory for the autonomous vehicle to navigate a specific segment of the route 225. For instance, the trajectory can be translated and provided to the vehicle control system(s) of the autonomous vehicle. The vehicle control system(s) can generate specific control signals for the autonomous vehicle (e.g., adjust steering, braking, velocity, etc.). The specific control signals can cause the autonomous vehicle to move in accordance with the selected trajectory.

To do so, the vehicle computing system (e.g., motion planning system, etc.) can obtain a basis path 230 indicative of an initial travel path for an autonomous vehicle from a first location 205 to a second location 210. The basis path 230, for example, can be obtained from a map repository (e.g., stored onboard the vehicle computing system, in a remote memory of one or more remote computing device communicatively connected to the vehicle computing system, etc.). By way of example, the vehicle computing system can determine a current location (e.g., a first location 205) associated with the vehicle and obtain map data and one or more corresponding basis paths from the map repository based on the current location. The basis path 230 (e.g., an initial travel path) can represent an ideal travel path from a first location 205 to a second location 210.

For example, the basis path 230 can be based on the map data. By way of example, the map data can include information about a particular geographic location including one or more geographic features such as roads, boundaries 220 (e.g., lane boundaries, curbs, etc.), buildings, information about expected traffic patterns, etc. The basis path 230 can include a nominal path for the autonomous vehicle with respect to geographic features of the map data such as, for example, a path that maintains the position of the autonomous vehicle within the lane boundaries 220 of a travel way (e.g., lane lines on a road, etc.) as identified by the map data. The basis path 230 can include a travel path from the first location 205 to the second location 210 without regard of any objects not included in the map data. By way of example, the ideal travel path can be determined without knowledge of the current surrounding environment of the vehicle and one or more static or dynamic object(s) therein.

In this regard, the basis path 230 can be pre-determined and/or dynamically determined in real-time for a particular geographic area. As an example, the basis path 230 can be pre-determined for the particular geographic area and stored (e.g., before the autonomous vehicle arrives in that particular geographic area). For instance, data indicative of the basis path 230 can be stored (e.g., while the vehicle is offline) in one or more remote computing devices, servers, etc. The data indicative of the basis path 230 can be obtained by the vehicle computing system (e.g., via the one or more remote computing devices, servers, etc.). For example, the data indicative of the basis path 230 can be encoded as a feature of map data obtained by the vehicle computing system. In addition, or alternatively, the basis path 230 can be determined in real-time as the autonomous vehicle is traveling. For example, the vehicle computing system (e.g., motion planning system, etc.) and/or one or more remote computing systems communicatively connected to the vehicle computing system can obtain map data based on the surrounding environment of the autonomous vehicle and determine the basis path 230 based on the map data.

Thus, the basis path 230 can include a path that avoids lane boundary violations 240. Lane boundary violations 240 can occur, for example, in the event that a violation path 235 takes the vehicle over and/or within a distance threshold of a lane boundary 220. For example, a vehicle can be associated with a vehicle shape 215. The vehicle shape 215 can include vehicle dimensions indicative of the size (e.g., footprint) of the vehicle. A lane boundary violation 240 can be detected and/or predicted by comparing the vehicle shape 215, lane boundaries 220 as indicated by the map data, and the location of vehicle during a path. Basis paths, such as basis path 230, can be determined such that they avoid lane boundary violations 240 of a violation path 235.

The technology of the present disclosure provides improved systems and methods for generating and selecting a trajectory for a vehicle based on the basis path 230. This can allow the vehicle computing system to select a trajectory from a variety of potential trajectories to help ensure that the autonomous vehicle is traveling safely and comfortably.

Figure 3:
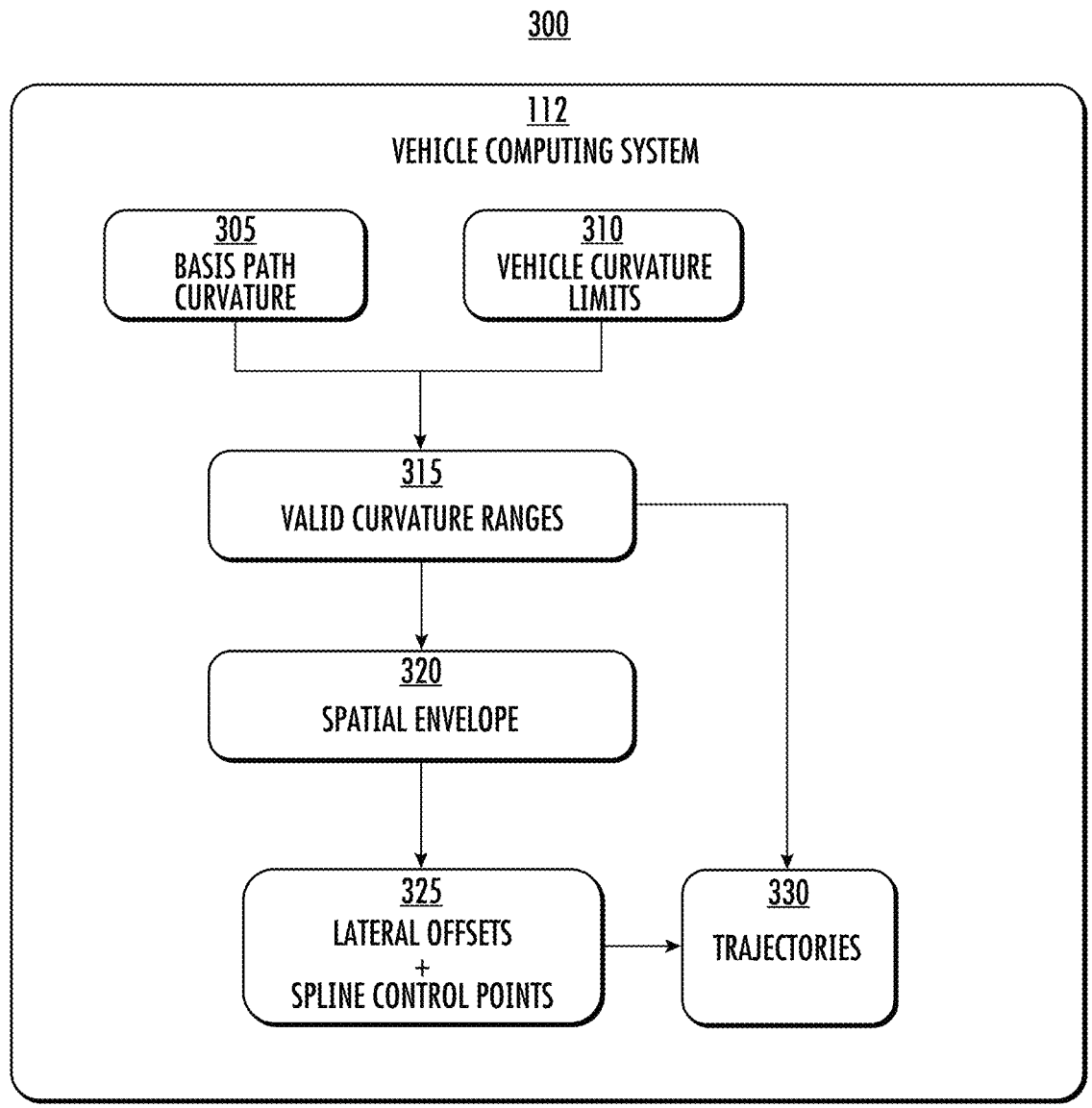
FIG. 3 depicts an example data flow diagram according to example embodiments of the present disclosure.

FIG. 3 depicts an example data flow diagram 300 according to example embodiments of the present disclosure for determining a plurality of viable trajectories. In particular, FIG. 3 depicts a vehicle computing system 112. The vehicle computing system 112 can refer to the vehicle computing system 112 of FIG. 1 and/or one or more components of the vehicle computing system 112 (e.g., perception system 124, prediction system 126, motion planning system 128, etc.). The vehicle computing system 112 can be configured to receive a basis path (such as basis path 230 depicted in FIG. 2) and vehicle curvature limits 310. As discussed in further detail below, the vehicle computing system 112 can determine one or more basis path curvatures 305, valid curvature ranges 315, spatial envelopes 320, lateral offsets and spline control points 325, and/or a plurality of trajectories 330 based on the basis path 230 and/or the vehicle curvature limits 210.

The initial travel path of the basis path 230 for the vehicle can include a plurality of spatial points (e.g., geographic coordinates, map coordinates, etc.) corresponding to one or more times. For example, the initial travel path can be associated with an overall travel time indicative of an expected duration of time to travel from the first location (e.g., first location 205 as depicted in FIG. 2) to the second location (e.g., second location 210 as depicted in FIG. 2). For instance, the travel time can be associated with a planning cycle of the vehicle computing system 112. Each of the plurality of spatial points can correspond to a point in time (e.g., 2 s, 5 s, 10 s, etc.) within the overall travel time (e.g., 15 s, etc.).

In addition, or alternatively, the initial travel path for the vehicle can be associated with a basis path curvature 305. In some implementations, the vehicle computing system can be configured to determine the basis path curvature 305. The basis path curvature 305, for example, can be based, at least in part, on the plurality of spatial coordinates. For instance, the basis path curvature 305 can include one or more angles formed by a plurality of consecutive spatial points of the initial travel path. By way of example, an initial travel path with a plurality of consecutive spatial points forming a straight line over time can be associated with a basis path curvature 305 of zero degrees and/or 180 degrees. As another example, an initial travel path with a plurality of consecutive spatial points forming one or more curves over time can include one or more angles (e.g., negative angles (e.g., −5 degrees, −10 degrees, etc.), positive angles (e.g., 5 degrees, 10 degrees, etc.), etc.) corresponding to each curve. In some examples, the basis path curvature 305 can include an angle value corresponding to each of the plurality of spatial coordinates forming the initial travel path.

The vehicle computing system 112 can determine a plurality of trajectories 330 based on the basis path 230. For example, a trajectory 330 can be defined by a spatial path (e.g., latitude value (x), longitude value (y), yaw, curvature, etc.) and/or steering quantities (e.g., wrench, twist, steering angle, steering angle velocity, angular velocity, lateral speed, lateral acceleration, lateral jerk, etc.) required to implement the spatial path. Each trajectory 330 can be associated with the overall travel time (e.g., 5 s, 8 s, 10 s, etc.) of the initial travel path. For example, each trajectory can include an offset spatial path indicative of a plurality of spatial points corresponding to one or more points in time within the travel time.

A trajectory 330 can include an offset profile including a plurality of offset values (e.g., one or more of lateral offsets 325). Each offset value can represent a distance and direction that the respective trajectory differs from the initial travel path at one or more times during the initial travel path. For example, a particular offset value can indicate that at a time 3 seconds into the path, the respective trajectory places the autonomous vehicle 0.7 meters north of the initial travel path. In some implementations, the offset profile (e.g., FIG. 6, FIG. 7, etc.) can be represented as a line on a graph wherein one axis on the graph represents the degree and direction of lateral variation from the initial travel path and the other axis represents time. Each offset profile can be mapped onto the initial travel path to generate one or more trajectories 330. Thus, each trajectory 330 can follow the general path of the initial travel path with one or more lateral adjustments.

Thus, the vehicle computing system 112 can generate the plurality of trajectories 330 for each route segment of the route (e.g., route 225 as depicted in FIG. 2). For example, each of the plurality of trajectories 330 can include spline control points 325. The spline control points 325 can include a beginning and ending of a respective trajectory. The plurality of trajectories for each route segment can be stitched together at the respective spline control points to generate a plurality of route segment trajectories including a trajectory for each route segment of the route 225.

The vehicle computing system 112 can generate a large number of potential trajectories 330 for the vehicle for each route segment of the route. For example, the potential trajectories 330 can include most, if not all, possible paths for the vehicle to travel during the route segment represented as a lateral deviation from the initial travel path. This allows many additional alternatives to quickly and efficiently be considered, while still maintaining a high degree of safety for the autonomous vehicle. For example, if the initial travel path can be represented as a path through an environment, the offset profile for a particular trajectory can be represented as a path that follows the general route of the initial travel path but is offset laterally along the initial travel path distance. The degree to which the particular trajectory is laterally offset from the initial travel path can be represented as a function of time.

The vehicle computing system 112 can determine a plurality of speed profiles (e.g., a speed, acceleration, velocity, etc. for each lateral offset of a respective trajectory) for each respective trajectory of the plurality of trajectories 330 and determine a cost for each possible combination of trajectories and speed profiles based, at least in part, on sensor data indicative of the surrounding environment of the vehicle. For instance, the vehicle computing system 112 can score each trajectory/speed profile against a cost function that ensures safe, efficient, and comfortable vehicle motion. The cost functions can be encoded for the avoidance of object collision, for the autonomous vehicle to stay on the travel way/within lane boundaries, prefer gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can also, or alternatively, take into account at least one of the following object cost(s): collision costs (e.g., cost of avoiding/experience potential collision, minimization of speed, etc.); overtaking buffer (e.g., give 4 ft of space with overtaking a bicycle, etc.); headway (e.g., preserve stopping distance when applying adaptive cruise control motion to a moving object, etc.); actor caution (e.g., preserve the ability to stop for unlikely events, etc.); behavioral blocking (e.g., avoid overtaking backed-up traffic in vehicle lane, etc.); or other parameters. In some implementations, the cost function(s) can account for a fixed buffer (e.g., a predetermine space requirement for actors, etc.) and/or speed dependent buffers (e.g., requiring more space for actors when the vehicle is passing at higher speeds, etc.). In some implementations, the cost function(s) can account for map geometry features such as the distance from the initial travel path, the location of lane boundaries, and road boundaries, etc. It should be appreciated that although the subject technology is described in terms of cost functions and reducing or minimizing cost, such functions could alternatively be determined as reward functions that are increased or maximized.

The amount of computing time and resources devoted to determining a cost for the plurality of trajectories 330 increases as a function of the number of trajectories costed. Thus, (as depicted in FIG. 3) the vehicle computing system 112 can filter and/or selectively generate the plurality of trajectories 330 based on one or more factors indicative of a likelihood that the trajectory will have a low cost. For example, the vehicle computing system 112 can filter and/or selectively generate the plurality of trajectories 330 based on vehicle configuration data. To do so, the vehicle computing system 112 can obtain the vehicle configuration data associated with the vehicle. As discussed above, with reference to FIG. 1, the vehicle configuration data can include one or more operational and/or physical capabilities of the vehicle. In some implementations, the vehicle computing system can determine one or more vehicle curvature limitations 310 of the vehicle based on the operational and/or physical capabilities of the vehicle. For instance, the one or more vehicle curvature limitation 310 can include a maximum twist steering angle, maximum steering angle velocity, maximum angular velocity, etc.

The vehicle computing system 112 can determine one or more valid curvature ranges 315 based on the basis path curvature 305 and the vehicle curvature limits 310. To do so, the vehicle computing system 112 can determine one or more secondary travel paths for the vehicle from the first location 205 to the second location 210 based on the basis path 230 (e.g., basis path curvature 305) and/or the vehicle configuration data (e.g., vehicle curvature limits 310).

Figure 4:
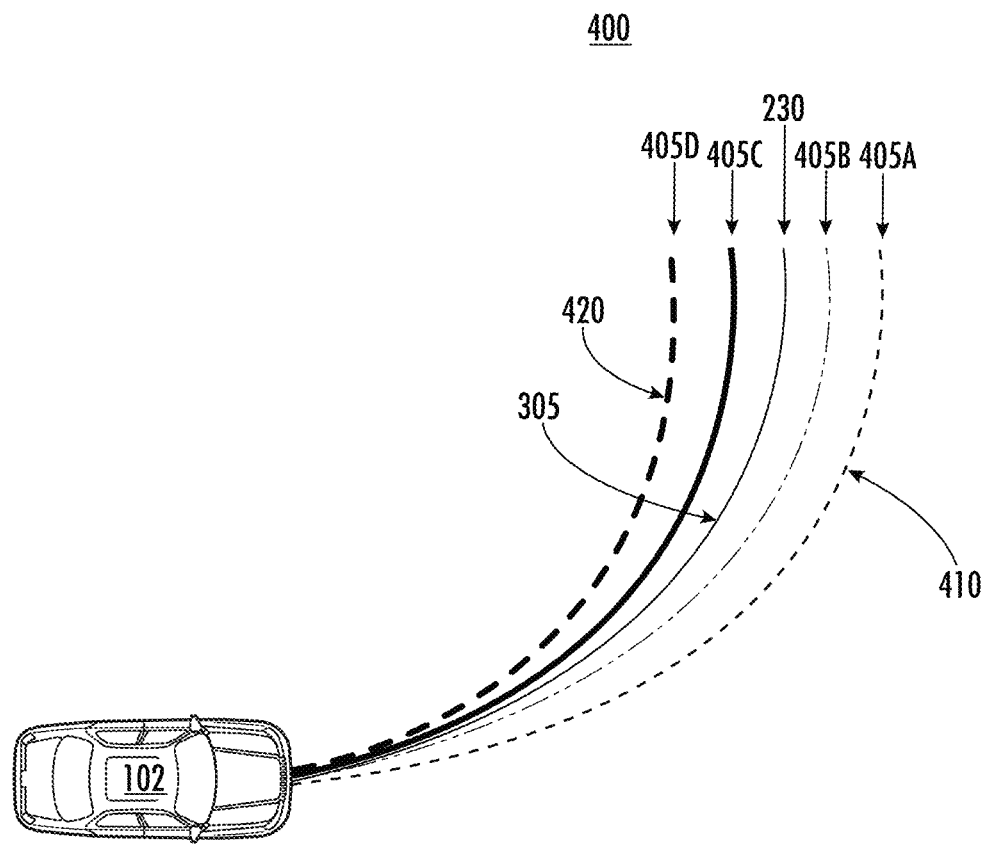
FIG. 4 depicts a representation of one or more secondary travel paths according to example embodiments of the present disclosure.

Turning to FIG. 4, FIG. 4 depicts a representation 400 of one or more secondary travel paths 405(*a-d*) according to example embodiments of the present disclosure. The one or more secondary travel paths 405(*a-d*) can include spatial path offsets from the initial travel path of the basis path 230. For example, the secondary travel paths 405(*a-d*) can include a plurality of secondary spatial points, each secondary spatial point being a distance and/or direction from a spatial point of the initial travel path of the basis path 230. The secondary travel paths 405(*a-d*) can include a minimum 405*a* and/or maximum travel path 405*d*. The minimum and/or maximum travel paths 405*a*/405*d* can be associated with a minimum and/or maximum driving angle 410/420 for the vehicle 102. The minimum and/or maximum driving angles 410/420, for example, can be determined based on the basis path 230 (e.g., the basis path curvature 305), vehicle configuration data (e.g., vehicle curvature limits 310), map data (e.g., map data 122), and/or sensor data (e.g., sensor data 116).

By way of example, the minimum and/or maximum travel paths 405A, 405D and/or driving angles 410, 420 can be determined based, at least in part, on road and/or obstacle limitations as indicated by the map data. For instance, the minimum and/or maximum travel paths 405A, 405D and/or driving angles 410, 420 can be defined by a curb or other roadway features (e.g., railing, tunnel wall, etc.). In addition, the minimum and/or maximum travel paths 405A, 405D and/or driving angles 410, 420 can be determined based on one or more objects and/or obstacles. For instance, the minimum and/or maximum travel paths 405A, 405D and/or driving angles 410, 420 can be defined such that they avoid one or more obstacles such as, for example, fallen trees, potholes, and any other object or roadway obstacle.

For example, the vehicle computing system (e.g., vehicle computing system 112 of FIG. 1) can determine a minimum viable driving angle 410 for the vehicle 102 based on the basis path 230 (e.g., basis path curvature 305), the vehicle configuration data (e.g., vehicle curvature limits 310), the map data, the sensor data, etc. The minimum viable driving angle 410 can be indicative of the lowest possible turning radius of the vehicle 102 that, if performed by the vehicle 102, will keep the vehicle 102 within a current travel lane (while avoiding any obstacles) without violating any physical or operational constraints such as, for example the vehicle curvature limits 310 of the vehicle 102 at any point during the overall travel time. For example, the minimum viable driving angle 410 can be determined based on a minimum twist steering angle, a steering angle velocity, an angular velocity, etc. that the vehicle 102 is capable of performing while remaining in the vehicle 102's current lane.

In addition, or alternatively, the vehicle 102 computing system can determine a maximum viable driving angle 420 for the vehicle 102 based on the basis path and the vehicle configuration data. The maximum viable driving angle 420 can be indicative of the highest possible turning radius of the vehicle 102 that, if performed by the vehicle 102, will keep the vehicle 102 within the travel lane (while avoiding any obstacles) without violating any physical or operational constraints such as, for example, the vehicle curvature limits 310 of the vehicle 102 at any point during the overall travel time. By way of example, the maximum viable driving angle 420 can be determined based on a maximum steering angle velocity, twist steering angle, angular velocity, etc. that the vehicle 102 is capable of performing while remaining in the vehicle 102's current lane.

The minimum travel path 405a for the vehicle 102 during the travel time can be indicative of a travel path (e.g., a plurality of secondary spatial points) for the vehicle 102 that is associated with a minimum curvature. The minimum curvature, for example, can be indicative of a minimum viable curvature for a travel path from the first location to the second location based on the minimum viable driving angle 410 for the vehicle 102 during the overall travel time. In this manner, the minimum curvature can be indicative of the minimum viable driving angle 410 for the vehicle 102 during the overall travel time. The maximum travel path for the vehicle 102 during the travel time can be indicative of a travel path (e.g., a plurality of secondary spatial points) for the vehicle 102 that is associated with a maximum curvature. The maximum curvature, for example, can be indicative of a maximum viable curvature for a travel path from the first location to the second location based on the maximum viable driving angle 420 for the vehicle 102 during the overall travel time. In this manner, the maximum curvature can be indicative of the maximum viable driving angle 420 for the vehicle 102 during the overall travel time.

Turning back to FIG. 3, in some implementations, the vehicle computing system 112 can generate (and/or filter) a plurality of trajectories 330 for the vehicle 102 to travel from the first location 205 to the second location 210 based, at least in part, on the one or more secondary travel paths 405(*a-d*) (e.g., with reference to FIG. 4). For instance, each of the plurality of trajectories 330 can be associated with a curvature (e.g., determined based on consecutive spatial points of the trajectory). The vehicle computing system 112 can generate (and/or filter) each of the plurality of trajectories 330 such that each trajectory is associated with one or more curvatures within the valid curvature range 315. The valid curvature range 315 can include, for example, a range of curvature between the minimum viable curvature 410 (e.g., with reference to FIG. 4) and the maximum viable curvature 420 (e.g., with reference to FIG. 4. For example, the vehicle computing system 112 can generate the plurality of trajectories 330 for the vehicle 102 by identifying one or more trajectories associated with one or more curvatures less than or equal to the maximum viable curvature 420 and/or greater than or equal to the minimum viable curvature 410.

In addition, or alternatively, the vehicle computing system 112 can generate a spatial envelope 320 based on the one or more secondary travel paths 405(*a-d*). For example, the vehicle computing system 112 can generate the spatial envelope 320 based on the valid curvature ranges 315 of the one or more secondary travel paths 405(*a-d*). For instance, the vehicle computing system 112 can convert the valid curvature values (e.g., minimum viable curvature 410, maximum viable curvature 420, etc.) of the valid curvature ranges 315 associated with the one or more secondary travel paths 405(*a-d*) (e.g., minimum travel path 405(*a*), maximum travel path 405(*d*), etc.) into an envelope of reachable space (e.g., the spatial envelope 320).

The spatial envelope 320 can include a plurality of minimum spatial points and a plurality of maximum spatial points that indicate the outer limits of the area reachable to the vehicle. For example, the vehicle computing system 112 can identify one or more minimum and/or maximum spatial points associated with the one or more secondary travel paths 405(*a-d*). The one or more minimum spatial points, for example, can be indicative of the one or more spatial points that form the minimum viable curvature 410 of the minimum travel path 405(*a*) for the vehicle. The one or more maximum spatial points, for example, can be indicative of the one or more spatial points that form the maximum viable curvature 420 of the maximum travel path 405(*d*).

Figure 5:
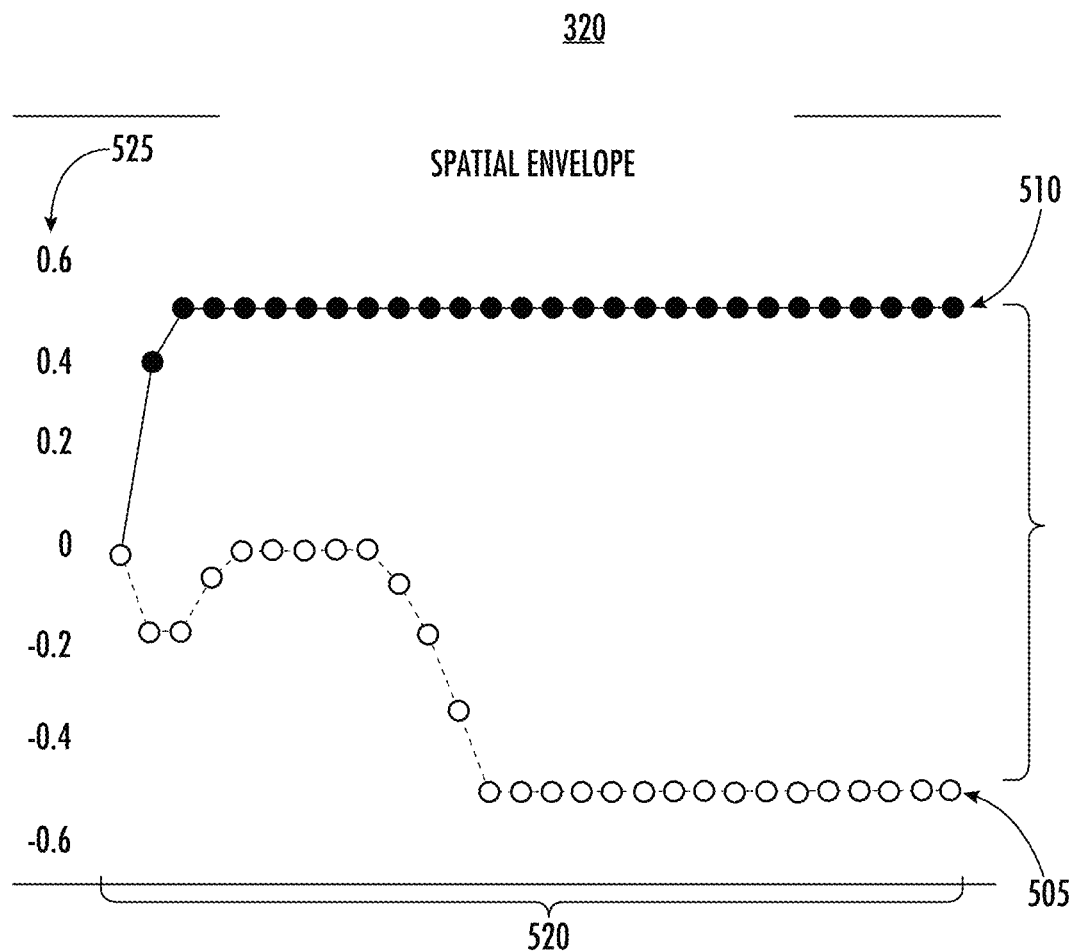
FIG. 5 depicts a representation of a spatial envelope according to example embodiments of the present disclosure.

FIG. 5 depicts a representation of a spatial envelope 320 according to example embodiments of the present disclosure. The vehicle computing system 112 can convert the minimum spatial points into one or more minimum lateral offsets 505. The one or more minimum lateral offsets 505, for example, can include a minimum lateral offset for each point in time during the travel time 520. By way of example, each minimum lateral offset at a respective point in time can be indicative of the furthest negative distance and/or direction from a spatial point of the basis path at the respective point in time.

In addition, or alternatively, the vehicle computing system 112 can convert the maximum spatial points into one or more maximum lateral offsets 510. The one or more maximum lateral offsets 510, for example, can include a maximum lateral offset for each point in time during the travel time 520. By way of example, each maximum lateral offset at a respective point in time can be indicative of the furthest positive distance and/or direction from a spatial point of the basis path at the respective point in time.

The spatial envelope 320 can be indicative of a plurality of lateral offsets 515 from the basis path. Each lateral offset of the plurality of lateral offsets can include a distance and/or direction (e.g., as indicated by spatial offsets 525) from at least one of the plurality of spatial points (e.g., geographic coordinates, map coordinates, etc.) of the initial travel path at one or more times corresponding to the at least one of the plurality of spatial points. For instance, the spatial envelope 320 can include a representation of each of the maximum and minimum lateral offsets 510/505 such that the space between the minimum and maximum lateral offsets represent valid lateral offsets 515 reachable by the vehicle. In this manner, the spatial envelope 320 can identify a plurality of lateral offsets indicative of a plurality of spatial coordinates at each point in time within the overall travel time 520.

Turning back to FIG. 3, the vehicle computing system 112 can determine a plurality of valid lateral offsets 325 based, at least in part, on the spatial envelope 320. The plurality of valid lateral offsets 325 can include, for example, each lateral offset identified within the spatial envelope 320. By way of example, the plurality of valid lateral offsets 325 can include a lateral offset for each spatial coordinate between the minimum lateral offset (e.g., minimum lateral offsets 505 of FIG. 5) and the maximum lateral offset (e.g., maximum lateral offsets 510 of FIG. 5) at any point in time during the overall travel time (e.g., overall travel time 520 of FIG. 5). Thus, each valid lateral offset of the plurality of valid lateral offsets 325 can be indicative of one or more spatial coordinates at a corresponding time.

The vehicle computing system 112 can generate (and/or filter) the plurality of trajectories 330 for the vehicle to travel from the first location 205 to the second location 210 based on the spatial envelope 320. As an example, each trajectory of the plurality of trajectories can include a lateral profile indicative of one or more lateral offsets and each lateral profile can include a lateral offset for each point in time during the overall travel time 520. The vehicle computing system 112 can determine a plurality of valid lateral offsets based on the spatial envelope 320 and generate (and/or filter) the plurality of trajectories 330 using the plurality of valid lateral offsets 325.

In addition, or alternatively, the vehicle computing system 112 can determine a plurality of speed profiles (e.g., a speed, acceleration, velocity, etc. for each lateral offset of a respective trajectory) for each respective trajectory of the plurality of trajectories 330 determined from the spatial envelope 420. For instance, the vehicle computing system 112 can generate and/or filter the plurality of speed profiles (e.g., a velocity profile) based on each respective trajectory of the plurality of trajectories 330 determined from the spatial envelope 420. Each of the plurality of speed profiles can be tailored to at least one respective trajectory of the plurality of trajectories 330 such that the speed profile (when combined with the respective trajectory), if performed by the vehicle, will keep the vehicle within a current travel lane (while avoiding any obstacles) without violating any physical or operational constraints of the vehicle at any point during the overall travel time. In this manner, the trajectories provided by the spatial envelope 420 can also limit speed profiles determined during velocity selection.

Figure 6:
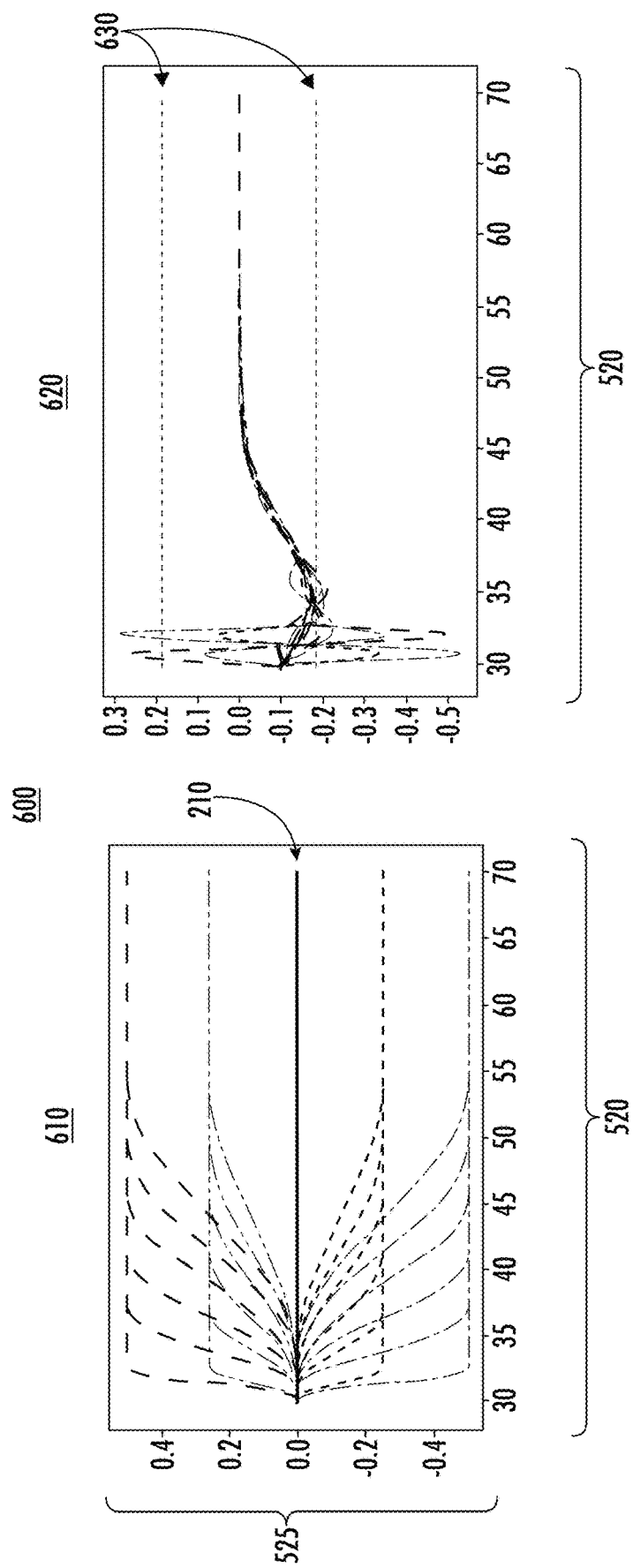
FIG. 6 depicts a plurality of possible lateral profiles based on a basis path according to example embodiments of the present disclosure.

FIG. 6 depicts a plurality of possible lateral profiles 610 based on a basis path 210 and a plurality of possible trajectories 620 corresponding to each of the plurality of possible lateral profiles 610. Each of the plurality of lateral profiles 610 include a plurality of lateral offsets one or more distances and/or directions (e.g., as indicated by spatial offsets 525) from a spatial point of the basis path 210. Each of the respective lateral profiles correspond to a respective trajectory (and/or curvature) of the plurality of trajectories 620 based on a sequence of the respective plurality of lateral offsets of the respective lateral profile. One or more of the plurality of possible paths 620 (e.g., curvatures of the paths) can violate one or more constraints 630 such as, for example, by violating any operational or physical capabilities of the vehicle, by leaving a lane in which the vehicle is currently travelling, etc. By generating (and/or filtering) the plurality of possible trajectories 720 for the vehicle to travel from the first location 205 to the second location 210 based on the spatial envelope 320, the vehicle computing system 112 can avoid the one or more of the plurality of possible trajectories 620 that violate the one or more constraints 630.

Figure 7:
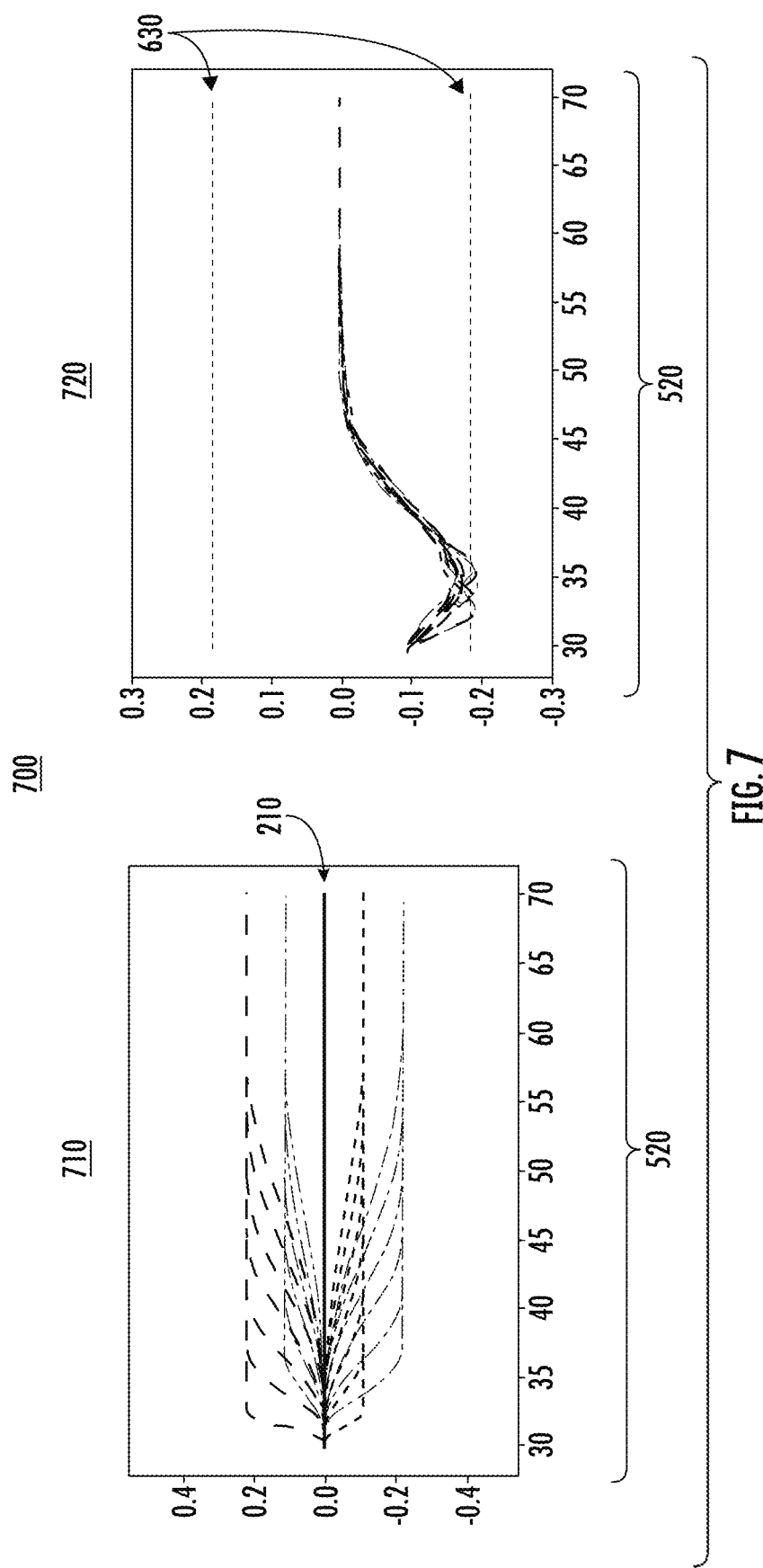
FIG. 7 depicts a plurality of viable lateral profiles based on a basis path according to example embodiments of the present disclosure.

For example, FIG. 7 depicts a plurality of viable lateral profiles 710 based on a basis path 210 and a plurality of viable trajectories 720 corresponding to each of the plurality of viable lateral profiles 710. By way of example, the vehicle computing system 112 can generate a plurality of valid lateral profiles 710, each valid lateral profile including a valid lateral offset for each point in time within the overall travel time 520. The vehicle computing system 112 can generate a plurality of trajectories 720 that correspond to the plurality of valid lateral profiles 710. In this manner, the vehicle computing system 112 can generate a plurality of trajectories 720 for the vehicle to travel from the first location 205 to the second location 210 based on the spatial envelope 320, with each of the plurality of trajectories 720 including one or more lateral offsets identified by the spatial envelope 320. Each of the plurality of trajectories 720 can be associated with one or more spatial coordinates (e.g., as identified by the valid lateral offsets) that are reachable by the vehicle without causing the vehicle to violate any constraints 630 such as, for example, by violating any operational or physical capabilities of the vehicle (e.g., vehicle curvature limits 310 of FIG. 3) or by leaving a lane in which the vehicle is currently travelling. For instance, each of the plurality of trajectories 720 can be associated with a curvature between the minimum viable curvature and the maximum viable curvature.

The vehicle computing system 112 can control a motion of the vehicle based, at least in part, on at least one of the plurality of trajectories 720. For example, the vehicle computing system 112 can determine a lowest cost trajectory of the plurality of trajectories 720 for the vehicle to travel from the first location 205 to the second location 210. The vehicle computing system 112 can determine one or more control inputs to implement the lowest cost trajectory. In some implementations, the vehicle computing system 112 can provide the one or more control inputs to a vehicle control system (e.g., the vehicle control system 138 of FIG. 1) to utilize in controlling the motion of the vehicle.

Figure 8:
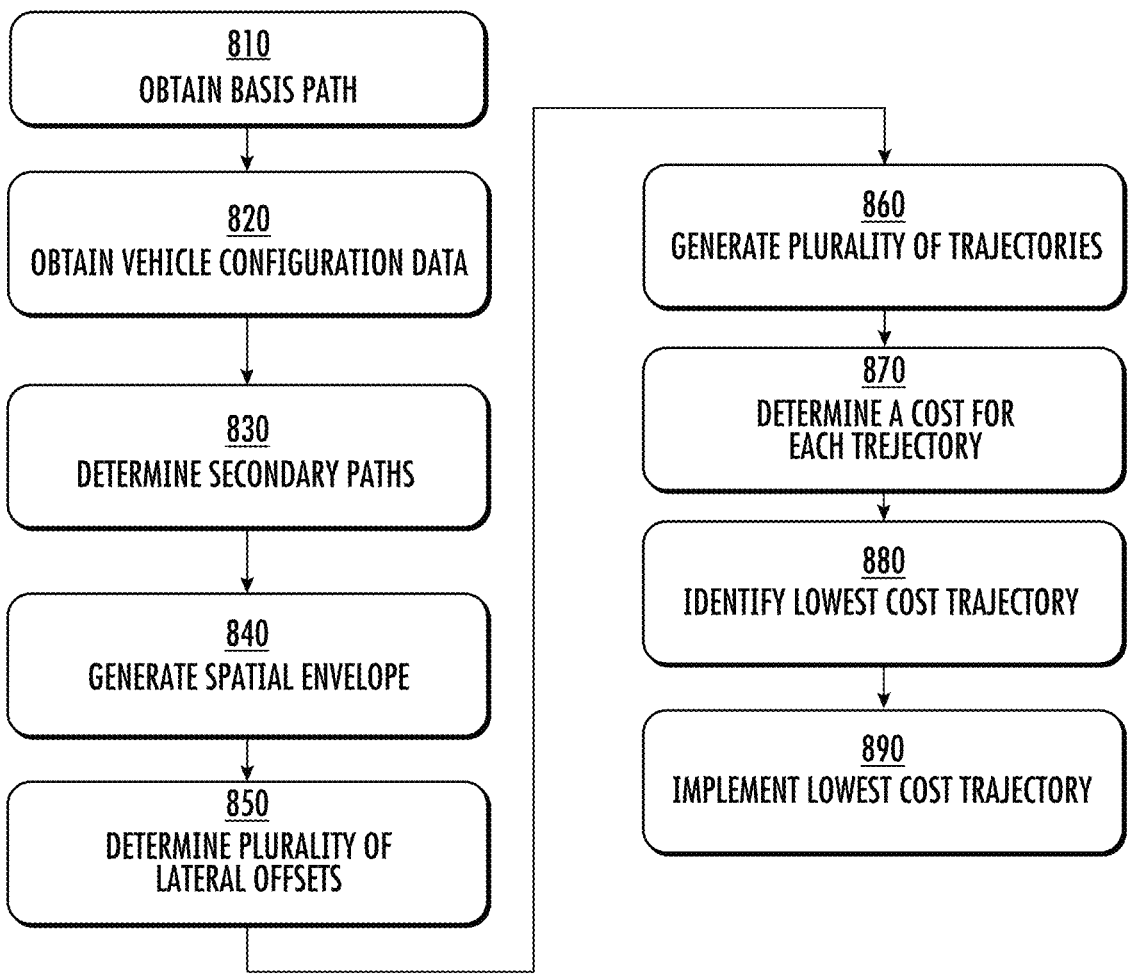
FIG. 8 depicts a flow diagram of an example method for determining a motion plan according to example embodiments of the present disclosure.

FIG. 8 depicts a flow diagram of an example method for determining a motion plan according to example embodiments of the present disclosure. One or more portion(s) of the method 800 can be implemented by a computing system that includes one or more computing devices such as, for example, the computing systems described with reference to the other figures (e.g., the vehicle computing system 112, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 9-10, etc.), for example, to determine one or more viable trajectories to travel. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, the method 800 can include obtaining a basis path. For example, a computing system (e.g., vehicle computing system 112, etc.) can obtain a basis path indicative of an initial path for an autonomous vehicle from a first location to a second location. The initial travel path for the autonomous vehicle can include a plurality of spatial coordinates corresponding to one or more times. In some implementations, the initial travel path for the autonomous vehicle can be associated with a curvature based, at least in part, on the plurality of spatial coordinates.

At 820, the method 800 can include obtaining vehicle configuration data. For example, a computing system (e.g., vehicle computing system 112, etc.) can obtain vehicle configuration data indicative of one or more physical capabilities and/or constraints of the autonomous vehicle. For instance, the one or more physical capabilities of the autonomous vehicle can include at least one of a maximum twist steering angle, maximum steering angle velocity, or a maximum angular velocity. In addition, or alternatively, the physical capabilities of the autonomous vehicle can be predetermined based, at least in part, on safety standards and/or one or more physical components of the autonomous vehicle. In some implementations, the one or more physical capabilities of the autonomous vehicle can be determined based, at least in part, on operational capabilities of the autonomous vehicle.

At 830, the method 800 can include determining secondary paths. For example, a computing system (e.g., vehicle computing system 112, etc.) can determine one or more secondary travel paths for the autonomous vehicle from the first location to the second location based, at least in part, on the basis path and the vehicle configuration data.

At 840, the method 800 can include generating a spatial envelope. For example, a computing system (e.g., vehicle computing system 112, etc.) can generate a spatial envelope based on the one or more secondary travel paths. The spatial envelope can be indicative of a plurality of lateral offsets from the basis path.

At 850, the method 800 can include determining a plurality of lateral offsets. For example, a computing system (e.g., vehicle computing system 112, etc.) can determine a plurality of valid lateral offsets based, at least in part, on the spatial envelope. For instance, each valid lateral offset of the plurality of valid lateral offsets can be indicative of one or more spatial coordinates at a corresponding time. By way of example, each lateral offset of the plurality of lateral offsets can include a distance and/or a direction from at least one of the plurality of spatial coordinates of the initial travel path at one or more times corresponding to the at least one of the plurality of spatial coordinates.

At 860, the method 800 can include generating a plurality of trajectories. For example, a computing system (e.g., vehicle computing system 112, etc.) can generate a plurality of trajectories for the autonomous vehicle to travel from the first location to the second location based, at least in part, on the spatial envelope. For instance, each of the plurality of trajectories can include one or more lateral offsets identified by the spatial envelope. In some implementations, the computing system (e.g., vehicle computing system 112, etc.) can generate the plurality of trajectories from the plurality of valid lateral offsets.

At 870, the method 800 can include determining a cost for each trajectory. For example, a computing system (e.g., vehicle computing system 112, etc.) can determine a lowest cost trajectory of the plurality of trajectories for the autonomous vehicle to travel from the first location to the second location.

At 880, the method 800 can include identifying a lowest cost trajectory. For example, a computing system (e.g., vehicle computing system 112, etc.) can identify the lowest cost trajectory.

At 890, the method 800 can include implementing the lowest cost trajectory. For example, a computing system (e.g., vehicle computing system 112, etc.) can implement the lowest cost trajectory by controlling a motion of the autonomous vehicle based, at least in part, on at least one of the plurality of trajectories. For instance, the computing system can generate a motion plan for the autonomous vehicle based at least in part on the lowest cost trajectory. The computing system can determine one or more control inputs to implement the motion plan. And, in some implementations, the computing system can provide the one or more control inputs to a vehicle control system to utilize in controlling the motion of the autonomous vehicle.

Figure 9:
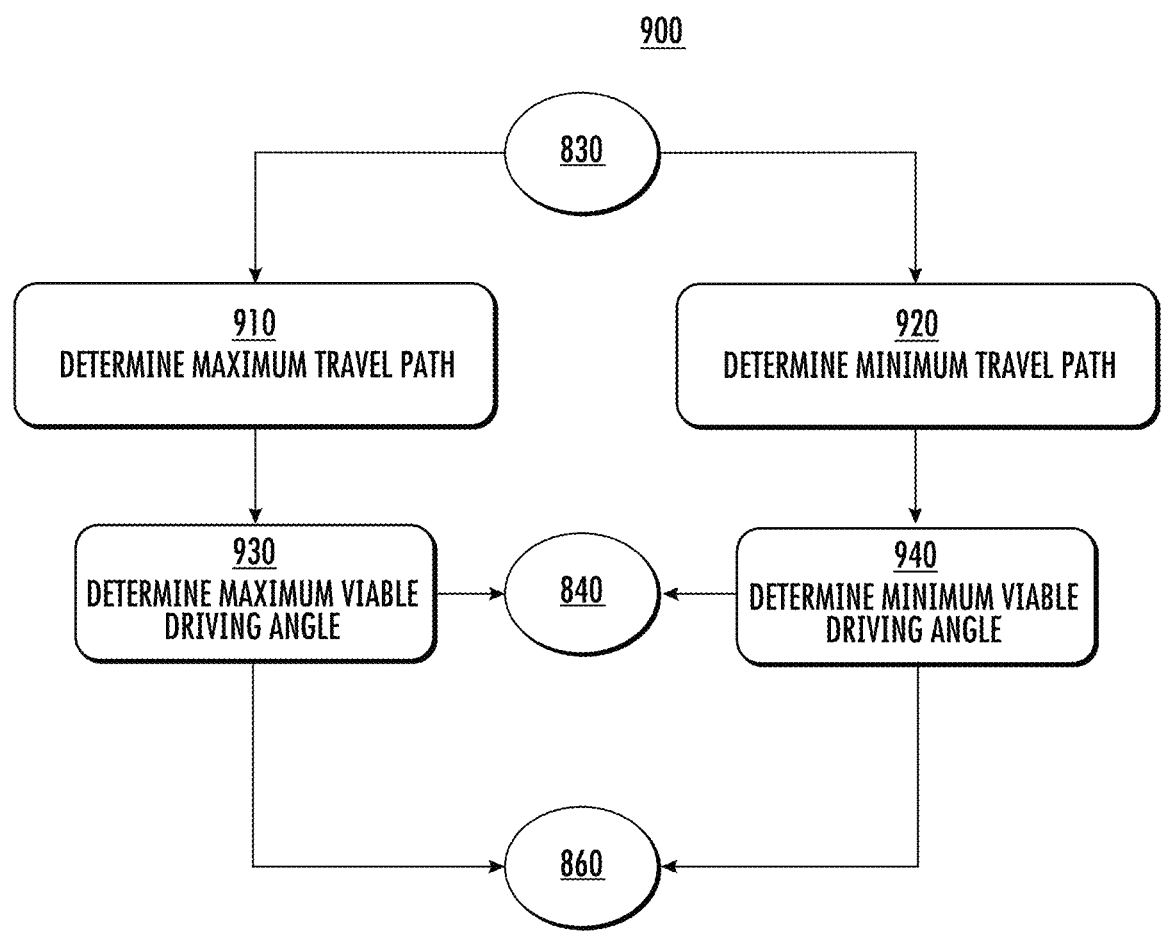
FIG. 9 depicts flow diagram of another example method for determining a motion plan according to example embodiments of the present disclosure.

FIG. 9 depicts another flow diagram of an example method for determining a motion plan according to example embodiments of the present disclosure. One or more portion(s) of the method 900 can be implemented by a computing system that includes one or more computing devices such as, for example, the computing systems described with reference to the other figures (e.g., the vehicle computing system 112, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 9-10, etc.), for example, to determine one or more viable trajectories to travel. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

Method 900 begins at step 830 where the method 800 includes determining one or more secondary paths.

At 910, the method 900 can include determining a maximum travel path. For example, a computing system (e.g., vehicle computing system 112, etc.) can determine the maximum travel path. For instance, the one or more secondary travel paths can include at least one maximum travel path indicative of a travel path for the autonomous vehicle associated with a maximum viable curvature.

At 920, the method 900 can include determining a minimum travel path. For example, a computing system (e.g., vehicle computing system 112, etc.) can determine minimum travel path. For instance, the one or more secondary travel paths can include at least one minimum travel path indicative of a travel path for the autonomous vehicle associated with a minimum viable curvature.

At 930, the method 900 can include determining a maximum viable driving angle. For example, a computing system (e.g., vehicle computing system 112, etc.) can determine the maximum viable driving angle. For instance, the maximum viable curvature can be indicative of the maximum viable driving angle for the autonomous vehicle based on the basis path and the vehicle configuration data. By way of example, the maximum viable driving angle can be based, at least in part, on at least one of the maximum twist steering angle, the maximum steering angle velocity, or the maximum angular velocity of the autonomous vehicle.

At 940, the method 900 can include determining a minimum viable driving angle. For example, a computing system (e.g., vehicle computing system 112, etc.) can determine the minimum viable driving angle. For instance, the minimum viable curvature can be indicative of the minimum viable driving angle for the autonomous vehicle based on the basis path and the vehicle configuration data. By way of example, the minimum viable driving angle can be based, at least in part, on at least one of a minimum twist steering angle, a minimum steering angle velocity, or a minimum angular velocity of the autonomous vehicle.

The method 900 can then return to step 840 where the method 800 includes generating a spatial envelope. For example, the plurality of lateral offsets identified by the spatial envelope can be indicative of a plurality of spatial coordinates between the at least one minimum travel path and the at least one maximum travel path.

In addition, or alternatively, the method 900 can return to step 860 where the method 800 includes generating a plurality of trajectories. For example, in some implementations, the computing system (e.g., vehicle computing system 112, etc.) can generate the plurality of trajectories by identifying one or more trajectories associated with a curvature less than or equal to the maximum viable curvature and/or greater than or equal to the minimum viable curvature. In this manner, each of the plurality of trajectories can be associated with a curvature between the minimum viable curvature and the maximum viable curvature.

Figure 10:
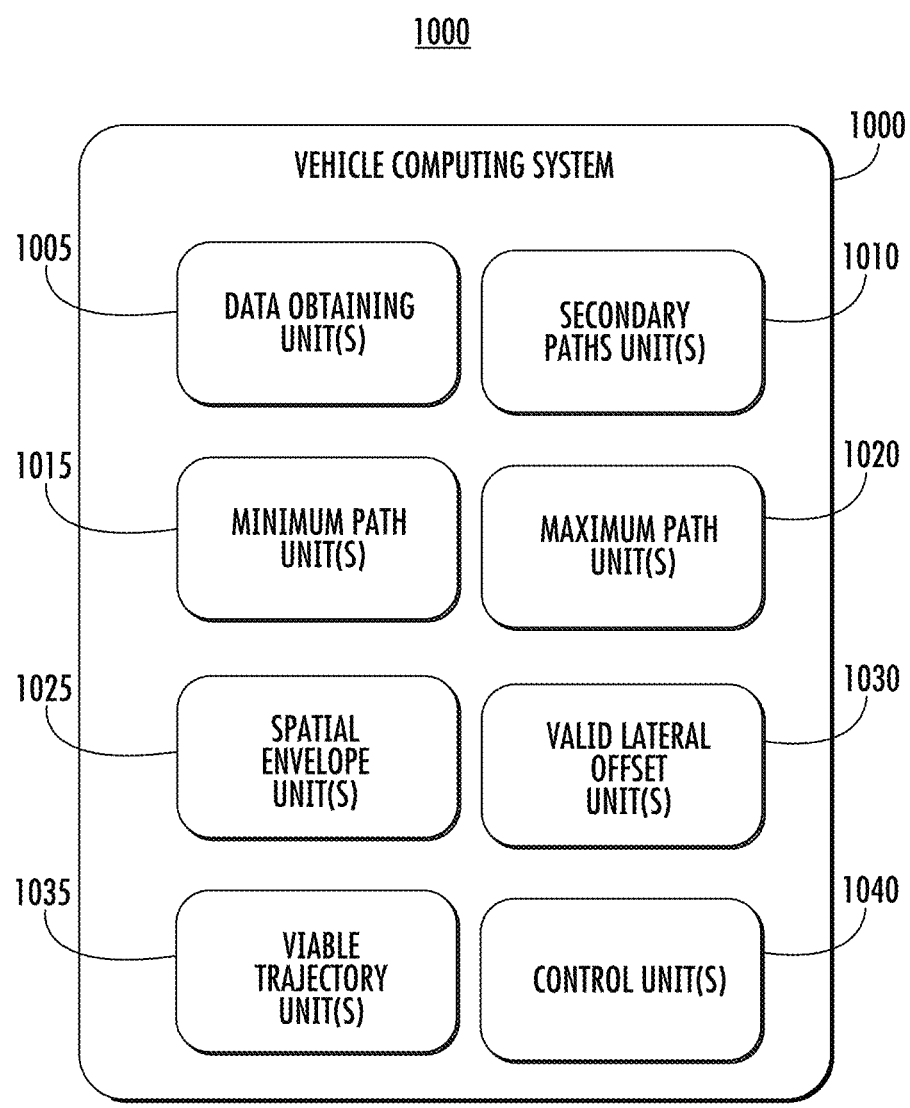
FIG. 10 depicts example units associated with a computing system for performing operations and functions according to example embodiments of the present disclosure.

FIG. 10 depicts an example of a training computing system 1000 according to example implementations of the present disclosure. One or more operations and/or functions in FIG. 10 can be implemented and/or performed by one or more devices (e.g., one or more computing devices of the vehicle computing system 112) or systems including, for example, the operations computing system 104, the vehicle 108, or the vehicle computing system 112, which are shown in FIG. 1. Further, the one or more devices and/or systems in FIG. 10 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a computing system can include data obtaining unit(s) 1005, secondary path unit(s) 1010, minimum path unit(s) 1015, maximum path unit(s) 1020, spatial envelope unit(s) 1025, valid lateral offset unit(s) 1030, viable trajectory unit(s) 1035, control unit(s) 1040 and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 1005, etc.) can be configured to obtain a basis path indicative of an initial travel path for an autonomous vehicle from a first location to a second location. In addition, the means (e.g., data obtaining unit(s) 1005, etc.) can be configured to obtain vehicle configuration data indicative of one or more physical capabilities of the autonomous vehicle.

The means (e.g., secondary paths unit(s) 1010, etc.) can be configured to determine one or more secondary travel paths for the autonomous vehicle from the first location to the second location based, at least in part, on the basis path and the vehicle configuration data. The means (e.g., minimum path unit(s) 1015, etc.) can be configured to identify at least one minimum travel path indicative of a travel path for the autonomous vehicle associated with a minimum curvature. The minimum curvature can be indicative of a minimum viable driving angle for the autonomous vehicle based on the basis path and the vehicle configuration data. The means (e.g., maximum path unit(s) 1020, etc.) can be configured to identify at least one maximum travel path indicative of a travel path for the autonomous vehicle associated with a maximum curvature. The maximum curvature can be indicative of a maximum viable driving angle for the autonomous vehicle based on the basis path and the vehicle configuration data.

The means (e.g., spatial envelope unit(s) 1025, etc.) can be configured to generate a spatial envelope based on the one or more secondary travel paths. The spatial envelope can be indicative of a plurality of lateral offsets from the basis path. The means (e.g., valid lateral offset unit(s) 1030, etc.) can be configured to determine one or more valid lateral offsets based on the spatial envelope.

The means (e.g., viable trajectory unit(s) 1035, etc.) can be configured generate a plurality of trajectories for the autonomous vehicle to travel from the first location to the second location based, at least in part, on the spatial envelope. Each of the plurality of trajectories can include one or more lateral offsets indicated by the spatial envelope. The means (e.g., control unit(s) 1040, etc.) can be configured to control a motion of the autonomous vehicle based, at least in part, on at least one of the plurality of trajectories.

FIG. 11 depicts example system components of an example system 1100 according to example embodiments of the present disclosure. The example system 1100 can include the computing system 1105 (e.g., a vehicle computing system 112) and the computing system(s) 1150 (e.g., operations computing system 104, remote computing device(s) 106, etc.), etc. that are communicatively coupled over one or more network(s) 1145.

The computing system 1105 can include one or more computing device(s) 1110. The computing device(s) 1110 of the computing system 1105 can include processor(s) 1115 and a memory 1120. The one or more processors 1115 can be any suitable processing device (e.g., a processor core, a microprocessor, an ASIC, a FPGA, a controller, a microcontroller, etc.) and can be one processor or a plurality of processors that are operatively connected. The memory 1120 can include one or more non-transitory computer-readable storage media, such as RAM, ROM, EEPROM, EPROM, one or more memory devices, flash memory devices, etc., and combinations thereof.

The memory 1120 can store information that can be accessed by the one or more processors 1115. For instance, the memory 1120 (e.g., one or more non-transitory computer-readable storage mediums, memory devices) can include computer-readable instructions 1125 that can be executed by the one or more processors 1115. The instructions 1125 can be software written in any suitable programming language or can be implemented in hardware. Additionally, or alternatively, the instructions 1125 can be executed in logically and/or virtually separate threads on processor(s) 1115.

For example, the memory 1120 can store instructions 1125 that when executed by the one or more processors 1115 cause the one or more processors 1115 to perform operations such as any of the operations and functions of the vehicle computing system 112, or for which the vehicle computing system 102 is configured, as described herein.

The memory 1120 can store data 1130 that can be obtained, received, accessed, written, manipulated, created, and/or stored. The data 1130 can include, for instance, sensor data, trajectory data, route data, and/or other data/information described herein. In some implementations, the computing device(s) 1110 can obtain from and/or store data in one or more memory device(s) that are remote from the computing system 1105 such as one or more memory devices of the computing system 1150.

The computing device(s) 1110 can also include a communication interface 1135 used to communicate with one or more other system(s) (e.g., computing system 1150). The communication interface 1135 can include any circuits, components, software, etc. for communicating via one or more networks (e.g., 1145). In some implementations, the communication interface 1135 can include for example, one or more of a communications controller, receiver, transceiver, transmitter, port, conductors, software and/or hardware for communicating data/information.

The computing system 1150 can include one or more computing devices 1155. The one or more computing devices 1155 can include one or more processors 1160 and a memory 1165. The one or more processors 1160 can be any suitable processing device (e.g., a processor core, a microprocessor, an ASIC, a FPGA, a controller, a microcontroller, etc.) and can be one processor or a plurality of processors that are operatively connected. The memory 1165 can include one or more non-transitory computer-readable storage media, such as RAM, ROM, EEPROM, EPROM, one or more memory devices, flash memory devices, etc., and combinations thereof.

The memory 1165 can store information that can be accessed by the one or more processors 1160. For instance, the memory 1165 (e.g., one or more non-transitory computer-readable storage mediums, memory devices) can store data 1175 that can be obtained, received, accessed, written, manipulated, created, and/or stored. The data 1175 can include, for instance, map data, vehicle operational data, vehicle capability data, basis path data, and/or other data or information described herein. In some implementations, the computing system 1150 can obtain data from one or more memory device(s) that are remote from the computing system 1150.

The memory 1165 can also store computer-readable instructions 1170 that can be executed by the one or more processors 1160. The instructions 1170 can be software written in any suitable programming language or can be implemented in hardware. Additionally, or alternatively, the instructions 1170 can be executed in logically and/or virtually separate threads on processor(s) 1160. For example, the memory 1165 can store instructions 1170 that when executed by the one or more processors 1160 cause the one or more processors 1160 to perform any of the operations and/or functions described herein, including, for example, any of the operations and functions of the operations computing system 102, remote computing devices 106, and/or other operations and functions.

The computing device(s) 1155 can also include a communication interface 1180 used to communicate with one or more other system(s). The communication interface 1180 can include any circuits, components, software, etc. for communicating via one or more networks (e.g., 1145). In some implementations, the communication interface 1180 can include for example, one or more of a communications controller, receiver, transceiver, transmitter, port, conductors, software and/or hardware for communicating data/information.

The network(s) 1145 can be any type of network or combination of networks that allows for communication between devices. In some embodiments, the network(s) 1145 can include one or more of a local area network, wide area network, the Internet, secure network, cellular network, mesh network, peer-to-peer communication link and/or some combination thereof and can include any number of wired or wireless links. Communication over the network(s) 1145 can be accomplished, for instance, via a network interface using any type of protocol, protection scheme, encoding, format, packaging, etc.

FIG. 11 illustrates one example system 1100 that can be used to implement the present disclosure. Other computing systems can be used as well. Computing tasks discussed herein as being performed at vehicle computing device(s) can instead be performed remote from the vehicle (e.g., via the operations computing system, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    (a) obtaining data indicative of an initial travel path;
    (b) obtaining data indicative of one or more constraints associated with one or more vehicle curvature limitations of an autonomous vehicle, the one or more vehicle curvature limitations determined based on physical capabilities of the autonomous vehicle;
    (c) generating a plurality of trajectories for the autonomous vehicle based at least in part on the initial travel path;
    (d) filtering at least one trajectory from the plurality of trajectories to generate a filtered plurality of trajectories, wherein filtering the at least one trajectory comprises determining that the at least one trajectory of the plurality of trajectories violates at least one of the one or more vehicle curvature limitations of the autonomous vehicle;
    (e) selecting a selected trajectory from the filtered plurality of trajectories;
    (f) generating a motion plan for the autonomous vehicle based on the selected trajectory; and
    (g) controlling a motion of the autonomous vehicle based at least in part on the motion plan.

2. The computer-implemented method of claim 1, wherein the one or more vehicle curvature limitations comprise one or more of maximum twist steering angle, maximum steering angle velocity, or a maximum angular velocity.

3. The computer-implemented method of claim 1, wherein the initial travel path for the autonomous vehicle comprises a plurality of spatial coordinates corresponding to one or more times.

4. The computer-implemented method of claim 3, wherein the initial travel path for the autonomous vehicle is associated with a curvature based at least in part on the plurality of spatial coordinates.

5. The computer-implemented method of claim 1, wherein determining that the at least one trajectory of the plurality of trajectories violates at least one of the one or more vehicle curvature limitations of the autonomous vehicle comprises determining that the autonomous vehicle passes outside a spatial envelope defined by the one or more vehicle curvature limitations.

6. The computer-implemented method of claim 5, wherein the spatial envelope represents a space that is viable for the autonomous vehicle to travel according to a respective trajectory.

7. The computer-implemented method of claim 6, wherein the spatial envelope is indicative of a plurality of spatial coordinates between at least one minimum travel path and at least one maximum travel path.

8. The computer-implemented method of claim 7, wherein the at least one minimum travel path is indicative of a minimum curvature of the autonomous vehicle, wherein the minimum curvature is indicative of a minimum viable driving angle for the autonomous vehicle, and
wherein the at least one maximum travel path is indicative of a maximum curvature for the autonomous vehicle, wherein the maximum curvature is indicative of a maximum viable driving angle for the autonomous vehicle.

9. The computer-implemented method of claim 1, wherein (e) comprises:
determining a cost of the selected trajectory based at least in part on a cost function; and
determining that the cost of the selected trajectory is lower than at least one other trajectory of the plurality of filtered trajectories.

10. The computer-implemented method of claim 9, wherein the cost function is based on costs associated with: (i) an acceleration of the autonomous vehicle, (ii) a smoothness of the autonomous vehicle, (iii) a velocity of the autonomous vehicle, and (iv) avoidance of an object.

11. The computer-implemented method of claim 1, wherein (g) comprises:
determining one or more control inputs to implement the motion plan; and
providing the one or more control inputs to a vehicle control system to utilize in controlling the motion of the autonomous vehicle.

12. The computer-implemented method of claim 1, wherein the autonomous vehicle is a truck.

13. An autonomous vehicle computing system comprising:
one or more processors; and
one or more tangible, non-transitory, computer readable media that store instructions that are executable by the one or more processors to cause the computing system to perform operations comprising:
(a) obtaining data indicative of an initial travel path;
(b) obtaining data indicative of one or more constraints associated with one or more vehicle curvature limitations of an autonomous vehicle, the one or more vehicle curvature limitations determined based on physical capabilities of the autonomous vehicle;
(c) generating a plurality of trajectories for the autonomous vehicle based at least in part on the initial travel path;
(d) filtering at least one trajectory from the plurality of trajectories to generate a filtered plurality of trajectories, wherein filtering the at least one trajectory comprises determining that the at least one trajectory of the plurality of trajectories violates at least one of the one or more vehicle curvature limitations of the autonomous vehicle;
(e) selecting a selected trajectory from the filtered plurality of trajectories;
(f) generating a motion plan for the autonomous vehicle based on the selected trajectory; and
(g) controlling a motion of the autonomous vehicle based at least in part on the motion plan.

14. The autonomous vehicle computing system of claim 13, wherein determining that the at least one trajectory of the plurality of trajectories violates at least one of the one or more vehicle curvature limitations of the autonomous vehicle comprises determining that the autonomous vehicle passes outside a spatial envelope defined by the one or more vehicle curvature limitations.

15. The autonomous vehicle computing system of claim 14, wherein the spatial envelope represents a space that is viable for the autonomous vehicle to travel according to a respective trajectory.

16. The autonomous vehicle computing system of claim 14, wherein the spatial envelope comprises a valid curvature range defined by a minimum viable driving angle for the autonomous vehicle and a maximum viable driving angle for the autonomous vehicle.

17. The autonomous vehicle computing system of claim 14, wherein (d) comprises filtering one or more of the plurality of trajectories that, at least partially, extend outside the spatial envelope.

18. The autonomous vehicle computing system of claim 13, wherein (d) comprises filtering the plurality of trajectories based at least in part on a cost function that provides a respective cost for each of the plurality of trajectories.

19. The autonomous vehicle computing system of claim 13, wherein (d) comprises generating a respective speed profile for each trajectory of the plurality of trajectories and filtering the plurality of trajectories based at least in part on the respective speed profiles.

20. One or more tangible, non-transitory, computer readable media that store instructions that are executable by one or more processors to cause the one or more processors to perform operations comprising:
(a) obtaining data indicative of an initial travel path;
(b) obtaining data indicative of one or more constraints associated with one or more vehicle curvature limitations of an autonomous vehicle, the one or more vehicle curvature limitations determined based on physical capabilities of the autonomous vehicle;
(c) generating a plurality of trajectories for the autonomous vehicle based at least in part on the initial travel path;

(d) filtering at least one trajectory from the plurality of trajectories to generate a filtered plurality of trajectories, wherein filtering the at least one trajectory comprises determining that the at least one trajectory of the plurality of trajectories violates at least one of the one or more vehicle curvature limitations of the autonomous vehicle;

(e) selecting a selected trajectory from the filtered plurality of trajectories;

(f) generating a motion plan for the autonomous vehicle based on the selected trajectory; and (g) controlling a motion of the autonomous vehicle based at least in part on the motion plan.

* * * * *